(12) United States Patent
Ward et al.

(10) Patent No.: US 8,150,421 B2
(45) Date of Patent: Apr. 3, 2012

(54) USER PLANE UPLINK TIME DIFFERENCE OF ARRIVAL (U-TDOA)

(75) Inventors: Matthew L. Ward, Collegeville, PA (US); Robert J. Anderson, Philadelphia, PA (US)

(73) Assignee: TruePosition, Inc., Berwyn, PA (US)

( * ) Notice: Subject to any disclaimer, the term of this patent is extended or adjusted under 35 U.S.C. 154(b) by 777 days.

(21) Appl. No.: 11/533,310

(22) Filed: Sep. 19, 2006

(65) Prior Publication Data

US 2007/0155401 A1  Jul. 5, 2007

Related U.S. Application Data

(63) Continuation-in-part of application No. 11/323,265, filed on Dec. 30, 2005.

(51) Int. Cl.
*H04W 24/00* (2009.01)
(52) U.S. Cl. ............... 455/456.5; 455/404.2; 455/456.1; 455/456.3
(58) Field of Classification Search ............... 455/456.1, 455/456.5, 456.3, 404.2; 701/214, 215
See application file for complete search history.

(56) References Cited

U.S. PATENT DOCUMENTS

| | | | |
|---|---|---|---|
| 4,445,118 A | 4/1984 | Taylor et al. ............... 343/357 |
| 4,728,959 A | 3/1988 | Maloney et al. ............ 342/457 |
| 5,327,144 A | 7/1994 | Stilp et al. ................. 342/387 |
| 5,602,903 A * | 2/1997 | LeBlanc et al. ........... 455/456.2 |
| 5,608,410 A | 3/1997 | Stilp et al. ................. 342/387 |
| 5,959,580 A | 9/1999 | Maloney et al. ............ 342/457 |
| 6,047,192 A | 4/2000 | Maloney et al. ............ 455/456 |
| 6,091,362 A | 7/2000 | Stilp et al. .................. 342/465 |
| 6,097,336 A | 8/2000 | Stilp ........................ 342/357.02 |
| 6,101,178 A | 8/2000 | Beal ............................. 370/336 |
| 6,108,555 A | 8/2000 | Maloney et al. ............ 455/456 |
| 6,115,599 A | 9/2000 | Stilp ............................ 455/404 |
| 6,119,013 A | 9/2000 | Maloney et al. ............ 455/456 |
| 6,127,975 A | 10/2000 | Maloney .................... 342/457 |
| 6,172,644 B1 | 1/2001 | Stilp ........................... 342/457 |

(Continued)

FOREIGN PATENT DOCUMENTS

WO    WO 2005/083646    9/2005

(Continued)

OTHER PUBLICATIONS

"Patent Cooperation Treaty," International Searching Authority, Mar. 14, 2008, 14 pages.

(Continued)

*Primary Examiner* — Nick Corsaro
*Assistant Examiner* — Edd Rianne Plata
(74) *Attorney, Agent, or Firm* — Woodcock Washburn LLP

(57) ABSTRACT

A system for locating a mobile wireless device is configured to communicate with a wireless communications system via a control plane and a user plane. The user plane includes a data channel, and the system includes a server configured to communicate via the data channel with a wireless device to be located. The server obtains from the wireless device information useful for tasking the wireless location system. The information useful for tasking may include information indicative of at least one cell site neighboring a serving cell site with which the wireless device is communicating. This may include information indicative of a serving cell site, a reverse channel through which the wireless device is communicating, and/or a hopping pattern, etc. The system may be used, for example, in connection with a GSM or UMTS wireless communications system.

208 Claims, 8 Drawing Sheets

U.S. PATENT DOCUMENTS

| | | | |
|---|---|---|---|
| 6,184,829 B1 | 2/2001 | Stilp | 342/387 |
| 6,252,544 B1 | 6/2001 | Hoffberg | |
| 6,266,013 B1 | 7/2001 | Stilp et al. | 342/387 |
| 6,281,834 B1 | 8/2001 | Stilp et al. | 342/174 |
| 6,285,321 B1 | 9/2001 | Stilp et al. | 342/465 |
| 6,288,675 B1 | 9/2001 | Maloney | 342/457 |
| 6,288,676 B1 | 9/2001 | Maloney | 342/457 |
| 6,317,081 B1 | 11/2001 | Stilp | 342/387 |
| 6,317,604 B1 | 11/2001 | Kovach, Jr. et al. | 455/456 |
| 6,334,059 B1 | 12/2001 | Stilp et al. | 455/456 |
| 6,351,235 B1 | 2/2002 | Stilp | 342/357.06 |
| 6,366,241 B2 | 4/2002 | Pack et al. | 342/442 |
| 6,388,618 B1 | 5/2002 | Stilp et al. | 342/457 |
| 6,400,320 B1 | 6/2002 | Stilp et al. | 342/457 |
| 6,463,290 B1* | 10/2002 | Stilp et al. | 455/456.1 |
| 6,483,460 B2 | 11/2002 | Stilp et al. | 342/457 |
| 6,492,944 B1 | 12/2002 | Stilp | 342/387 |
| 6,501,955 B1 | 12/2002 | Durrant et al. | 455/456.1 |
| 6,519,465 B2 | 2/2003 | Stilp et al. | 455/456 |
| 6,546,256 B1 | 4/2003 | Maloney et al. | 455/456 |
| 6,563,460 B2 | 5/2003 | Stilp et al. | 342/457 |
| 6,603,428 B2 | 8/2003 | Stilp | 342/457 |
| 6,646,604 B2 | 11/2003 | Anderson | 342/465 |
| 6,661,379 B2 | 12/2003 | Stilp et al. | 342/457 |
| 6,765,531 B2 | 7/2004 | Anderson | 342/378 |
| 6,771,625 B1 | 8/2004 | Beal | 370/336 |
| 6,778,820 B2 | 8/2004 | Tendler | |
| 6,782,264 B2 | 8/2004 | Anderson | 455/456.1 |
| 6,826,394 B1* | 11/2004 | Raith | 455/404.2 |
| 6,850,764 B1 | 2/2005 | Patel | 455/450 |
| 6,863,610 B2 | 3/2005 | Vancraeynest | 463/41 |
| 6,873,290 B2 | 3/2005 | Anderson et al. | 342/457 |
| 6,876,859 B2 | 4/2005 | Anderson et al. | 455/456.1 |
| 6,919,842 B2 | 7/2005 | Cho | |
| 6,929,264 B2 | 8/2005 | Huard et al. | |
| 7,016,693 B2 | 3/2006 | Guyot | |
| 7,023,383 B2 | 4/2006 | Stilp et al. | 342/457 |
| 7,047,010 B2* | 5/2006 | Semper | 455/439 |
| 7,103,310 B2* | 9/2006 | Lucidarme et al. | 455/1 |
| 7,151,939 B2 | 12/2006 | Sheynblat | |
| 7,229,354 B2 | 6/2007 | McNutt et al. | |
| 2001/0022558 A1* | 9/2001 | Karr et al. | 342/450 |
| 2002/0085622 A1 | 7/2002 | Dhar et al. | 375/132 |
| 2003/0023726 A1* | 1/2003 | Rice et al. | 709/225 |
| 2003/0036428 A1 | 2/2003 | Aasland | |
| 2003/0087647 A1* | 5/2003 | Hurst | 455/456 |
| 2003/0092448 A1* | 5/2003 | Forstrom et al. | 455/456 |
| 2003/0119528 A1* | 6/2003 | Pew et al. | 455/456 |
| 2004/0137987 A1* | 7/2004 | Nguyen et al. | 463/42 |
| 2004/0147323 A1 | 7/2004 | Cliff et al. | |
| 2004/0192353 A1* | 9/2004 | Mason et al. | 455/457 |
| 2004/0203844 A1* | 10/2004 | Rajkotia | 455/456.1 |
| 2005/0003831 A1 | 1/2005 | Anderson | 455/456.1 |
| 2005/0026650 A1* | 2/2005 | Russell | 455/554.1 |
| 2005/0187020 A1 | 8/2005 | Amaitis et al. | |
| 2005/0192026 A1* | 9/2005 | Carlson et al. | 455/456.1 |
| 2005/0192029 A1* | 9/2005 | Aigner et al. | 455/456.5 |
| 2005/0206566 A1 | 9/2005 | Stilp et al. | 342/455 |
| 2006/0003775 A1 | 1/2006 | Bull et al. | 455/456.1 |
| 2006/0025106 A1* | 2/2006 | Byers et al. | 455/404.2 |
| 2006/0030333 A1 | 2/2006 | Ward et al. | 455/456.1 |
| 2006/0046747 A1* | 3/2006 | Abraham et al. | 455/456.6 |
| 2006/0194594 A1* | 8/2006 | Ruutu et al. | 455/456.5 |
| 2007/0155489 A1 | 7/2007 | Beckley et al. | |
| 2009/0005061 A1 | 1/2009 | Ward et al. | |

FOREIGN PATENT DOCUMENTS

| | | |
|---|---|---|
| WO | WO 2005112419 | 11/2005 |
| WO | WO 2006/090258 A1 | 8/2006 |
| WO | WO 2006/091684 | 8/2006 |
| WO | WO 2007/079395 | 7/2007 |
| WO | WO 2008/036673 | 3/2008 |
| WO | WO 2008/036676 | 3/2008 |

OTHER PUBLICATIONS

3GPP™, "Technical Specification 3GPP TS 23.171: Technical Specification Group Services and System Aspects; Functional stage 2 description of location services in UMTS," 2004, *version 3.11.0*, 1-53.

GSM® and 3GPP™, "Technical Standards for 3GPP: 03.71: Technical Specification Group Services and System Aspects; Location Services (LCS); Functional description; Stage 2," 2004, *version 8.9.0*, 1-110.

GSM® and 3GPP™, "Technical Report GSM 01.04: Digital cellular telecommunications system (Phase 2+); Abbreviations and Acronyms," 2000, *version 8.0.0*, 1-17.

GSM Association ©, "Mobile Terms & Acronyms," http://www.gsmworld.com/technology/glossary.shtml, 2006, 25 pages.

RFC-3694 ©, "Internet Engineering Task Force (IETF) Request for Comment RFC-3694: Threat Analysis of the Geopriv Protocol," 2004, 17 pages.

"A-GPS field trials and technical analysis—Final report," Helios Technology Limited, May 17, 2004, pp. 1-154.

Madsen et al., "Liberty ID-SIS Geolocation Service Implementation Guidelines," Liberty Alliance Project, 2005, version 1.0-15, 1-20.

Open Mobile Alliance, Ltd., "Enabler Release Definition for Mobile Location Service (MLS)," OMA-ERELD-,LS-V1_0-20050607-C, 2005, candidate version 1.0-07, 1-15.

Open Mobile Alliance, Ltd., "OMA Mobile Service Architecture," OMA-AD-MLS-V1_0-20050607-C, 2005, candidate version 1.0-07, 1-11.

Open Mobile Alliance, Ltd., "Roaming Location Protocol," OMA-TS-RLP-V1_0-20050607-C, 2005, candidate version 1.0-07, 1-94.

Open Mobile Alliance, Ltd., "Mobile Location Protocol 3.2," OMA-TS-MLP-V3_2-20050607-C, 2005, candidate version 3.2-07, 1-132.

Open Mobile Alliance, Ltd., "Mobile Location Service Requirements," OMA-RD-MLS-V1_0-20050510-C, 2005, candidate version 1.0-10, 1-15.

RFC-3693 ©, "Internet Engineering Task Force (IETF) Request for Comment RFC-3693: Geopriv Requirements," 2004, 1-30.

Patent Cooperation Treaty, "Notification of Transmittal of the International Search Report and the Written Opinion of the International Searching Authority, or the Declaration," International Searching Authority, PCT/US07/78786, Mar. 5, 2008.

Patent Cooperation Treaty, "Written Opinion of the International Serching Authority," International Searching Authority, PCT/US06/62682, Sep. 17, 2008.

Dyoub, et al., "Dueling Architectures: Control Plane vs. User Plane: Which is right for you?" Hewlett Packard, 2004, document obtained from http://h71019.www7.hp.com/enterprise/downloads/Article_Dueling_Architectures_UserPlane-ControlPlane.pdf, Sep. 1, 2010, 2 pages.

EPC Application No. 06849108.3: Extended European Search Report dated Jun. 14, 2010.

Great Britain Application No. GB0812741.7: Intellectual Property Office Examination Report dated Jun. 29, 2010, 9 pages.

"Cellular Telephone Basics", Privateline.com, Dec. 2005, http://replay.waybackmachine.org/20051212105925/http://www.privateline.com/Cellbasics/Cellbasics02.html., Accessed Mar. 10, 2011, 5 pages.

Anonymous, "N-Gage", Wikipedia, The Free Encyclopedia, Oct. 7, 2003, http://en.wikipedia.org/wiki/N-Gage, Accessed Nov. 2, 2010, 6 pages.

European Patent Application No. EP 09156628: European Search Report, Dated Nov. 5, 2010, 8 pages.

Open Mobile Alliance, "Secure User Plane Location Architecture V1.0", OMA-AD-SUPL-V10-20050719-C, Jul. 19, 2005, 80 pages.

Rich, "Schaum's Outlines Geometry", 3$^{rd}$ Edition, The McGraw-Hill Companies, 2000, 242-243.

* cited by examiner

Potential User Plane Information Fields

| Event Related Information | |
|---|---|
| | Event Timestamp |
| | Event Type (Trigger) |
| | Originator (Application Name) |

| Mobile or Subscriber Related Information | |
|---|---|
| | Mobile Station Integrated Services Digital Network (MS-ISDN) |
| | International Mobile Equipment Identifier (IMEI) |
| | International Mobile Station Identifier (IMSI) |

| Conversation Related Information | |
|---|---|
| | Calling Number |
| | Called Number |

| Serving Cell and Radio Related Information | |
|---|---|
| | Serving Cell - Cell Global Identity (CGI) |
| | Serving Cell - Absolute Radio Frequency Channel Number (ARFCN) |
| | Serving Cell - Base Station Identity Code (BSIC) |
| | Prior Cell - CGI and TA *(for handover event only)* |
| | Uplink Receive Level and Quality |
| | Downlink Receive Level and Quality |
| | Serving Cell - Beacon (BCCH) ARFCN |
| | Serving Cell - Beacon (BCCH) BISC |
| | Serving Cell - Broadcast Allocation (BA(SACCH)) ARFCN |
| | Timing Advance (TA) |
| | Network Measurement Reports (NMR) |
| | Etc. |

Figure 6

USER PLANE UPLINK TIME DIFFERENCE OF ARRIVAL (U-TDOA)

CROSS REFERENCE

This application is a continuation-in-part of application Ser. No. 11/323,265, filed on Dec. 30, 2005, entitled "DEVICE AND NETWORK ENABLED GEO-FENCING FOR AREA SENSITIVE GAMING ENABLEMENT," the content of which is hereby incorporated by reference in its entirety.

TECHNICAL FIELD

The subject matter described herein relates generally to methods and apparatus for locating wireless devices, and enabling, selectively enabling, limiting, denying, or delaying certain functions or services based on the calculated geographic location and a pre-set location area defined by local, regional, or national legal jurisdictions. Wireless devices, also called mobile stations (MS), include those such as used in analog or digital cellular systems, personal communications systems (PCS), enhanced specialized mobile radios (ESMRs), wide-area-networks (WANs), and other types of wireless communications systems. Affected functions or services can include those either local to the mobile station or performed on a landside server or server network. More particularly, but not exclusively, the subject matter described herein relates to a user plane approach to network-based wireless location.

BACKGROUND

This application is related by subject matter to U.S. application Ser. No. 11/198,996, filed Aug. 8, 2005, entitled "Geo-Fencing in a Wireless Location System" (the entirety of which is hereby incorporated by reference), which is a continuation of U.S. application Ser. No. 11/150,414, filed Jun. 10, 2005, entitled "Advanced Triggers for Location Based Service Applications in a Wireless Location System," which is a continuation-in-part of U.S. application Ser. No. 10/768,587, filed Jan. 29, 2004, entitled "Monitoring of Call Information in a Wireless Location System," now pending, which is a continuation of U.S. application Ser. No. 09/909,221, filed Jul. 18, 2001, entitled "Monitoring of Call Information in a Wireless Location System," now U.S. Pat. No. 6,782,264 B2, which is a continuation-in-part of U.S. application Ser. No. 09/539,352, filed Mar. 31, 2000, entitled "Centralized Database for a Wireless Location System," now U.S. Pat. No. 6,317,604 B1, which is a continuation of U.S. application Ser. No. 09/227,764, filed Jan. 8, 1999, entitled "Calibration for Wireless Location System," now U.S. Pat. No. 6,184,829 B1.

This application is also related by subject matter to Published U.S. Patent Application No. US20050206566A1, "Multiple Pass Location Processor," filed on May 5, 2005, which is a continuation of U.S. application Ser. No. 10/915,786, filed Aug. 11, 2004, entitled "Multiple Pass Location Processor," now U.S. Pat. No. 7,023,383, issued Apr. 4, 2006, which is a continuation of U.S. application Ser. No. 10/414,982, filed Apr. 15, 2003, entitled "Multiple Pass Location Processor," now U.S. Pat. No. 6,873,290 B2, issued Mar. 29, 2005, which is a continuation-in-part of U.S. patent application Ser. No. 10/106,081, filed Mar. 25, 2002, entitled "Multiple Pass Location Processing," now U.S. Pat. No. 6,603,428 B2, issued Aug. 5, 2003, which is a continuation of U.S. patent application Ser. No. 10/005,068, filed on Dec. 5, 2001, entitled "Collision Recovery in a Wireless Location System," now U.S. Pat. No. 6,563,460 B2, issued May 13, 2003, which is a divisional of U.S. patent application Ser. No. 09/648,404, filed on Aug. 24, 2000, entitled "Antenna Selection Method for a Wireless Location System," now U.S. Pat. No. 6,400,320 B1, issued Jun. 4, 2002, which is a continuation of U.S. patent application Ser. No. 09/227,764, filed on Jan. 8, 1999, entitled "Calibration for Wireless Location System," now U.S. Pat. No. 6,184,829 B1, issued Feb. 6, 2001.

A great deal of effort has been directed to the location of wireless devices, most notably in support of the Federal Communications Commission's (FCC) rules for Enhanced 911 (E911) Phase (The wireless Enhanced 911 (E911) rules seek to improve the effectiveness and reliability of wireless 911 service by providing 911 dispatchers with additional information on wireless 911 calls. The wireless E911 program is divided into two parts—Phase I and Phase II. Phase I requires carriers, upon valid request by a local Public Safety Answering Point (PSAP), to report the telephone number of a wireless 911 caller and the location of the antenna that received the call. Phase II requires wireless carriers to provide more precise location information, within 50 to 300 meters in most cases. The deployment of E911 has required the development of new technologies and upgrades to local 911 PSAPs, etc.) In E911 Phase II, the FCC's mandate included required location precision based on circular error probability. Network-based systems (wireless location systems where the radio signal is collected at the network receiver) were required to meet a precision of 67% of callers within 100 meters and 95% of callers within 300 meters. Handset-based systems (wireless location systems where the radio signal is collected at the mobile station) were required to meet a precision of 67% of callers within 50 meters and 95% of callers within 100 meters. Wireless carriers were allowed to adjust location accuracy over service areas so the accuracy of any given location estimation could not be guaranteed.

While some considerations, such as accuracy and yield (the number of successful locations per calls) were defined by the FCC for the single LBS service of E911, additional quality-of-service (QoS) parameters such as latency (time to location fix and delivery of the location estimate to the requesting or selected application) were not. The FCC concern with accuracy was for the particular instance of a cellular call being placed to an emergency services center (the 911 centers or PSAP). The state-of-the-art and the FCC's rigorous accuracy standards limited the technology choices for widely deployed location technologies. Network-based options for E911 Phase II included uplink-time-difference-of-arrival (U-TDOA), angle of arrival (AoA), and TDOA/AoA hybrids. Non-network-based location options for E911 Phase II included use of the Navistar Global Positioning System (GPS) augmented with data from a landside server that includes synchronization timing, orbital data (Ephemeris) and acquisition data (code phase and Doppler ranges).

Besides the FCC E911 compliant location systems for wireless voice communications, other wireless location systems using Time-of-Arrival (TOA), Time-Difference-of-Arrival (TDOA), Angle-of-Arrival (AoA), Power-of-Arrival (POA), Power-Difference-of-Arrival can be used to develop a location to meet specific location-based services (LBS) requirements.

In the Detailed Description section below, we provide further background on location techniques and wireless communications systems that may be employed in connection with the present invention. In the remainder of this Background section, we provide further background on wireless location systems.

Early work relating to Wireless Location Systems is described in U.S. Pat. No. 5,327,144, Jul. 5, 1994, "Cellular Telephone Location System," which discloses a system for locating cellular telephones using time difference of arrival (TDOA) techniques. Further enhancements of the system disclosed in the '144 patent are disclosed in U.S. Pat. No. 5,608,410, Mar. 4, 1997, "System for Locating a Source of Bursty Transmissions." Both of these patents are assigned to TruePosition, Inc., the assignee of the present invention. TruePosition has continued to develop significant enhancements to the original inventive concepts.

Over the past few years, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. The air interface protocols now used in the wireless industry include AMPS, N-AMPS, TDMA, CDMA, GSM, TACS, ESMR, GPRS, EDGE, UMTS WCDMA, and others.

The wireless communications industry has acknowledged the value and importance of the Wireless Location System. In June 1996, the Federal Communications Commission issued requirements for the wireless communications industry to deploy location systems for use in locating wireless 911 callers. Widespread deployment of these systems can reduce emergency response time, save lives, and save enormous costs because of reduced use of emergency response resources. In addition, surveys and studies have concluded that various wireless applications, such as location sensitive billing, fleet management, and others, will have great commercial value in the coming years.

As mentioned, the wireless communications industry uses numerous air interface protocols in different frequency bands, both in the U.S. and internationally. In general, neither the air interface nor the frequency bands impact the Wireless Location System's effectiveness at locating wireless telephones.

All air interface protocols use two categories of channels, where a channel is defined as one of multiple transmission paths within a single link between points in a wireless network. A channel may be defined by frequency, by bandwidth, by synchronized time slots, by encoding, shift keying, modulation scheme, or by any combination of these parameters. The first category, called control or access channel, is used to convey information about the wireless telephone or transmitter, for initiating or terminating calls, or for transferring bursty data. For example, some types of short messaging services transfer data over the control channel. Different air interfaces use different terminology to describe control channels but the function of the control channels in each air interface is similar. The second category of channel, known as voice or traffic channel, typically conveys voice or data communications over the air interface. Traffic channels come into use once a call has been set up using the control channels. Voice and user data channels typically use dedicated resources, i.e., the channel can be used only by a single mobile device, whereas control channels use shared resources, i.e., the channel can be accessed by multiple users. Voice channels generally do not carry identifying information about the wireless telephone or transmitter in the transmission. For some wireless location applications this distinction can make the use of control channels more cost effective than the use of voice channels, although for some applications location on the voice channel can be preferable.

The following paragraphs discuss some of the differences in the air interface protocols:

AMPS—This is the original air interface protocol used for cellular communications in the U.S. and described in TIA/EIA Standard IS 553A. The AMPS system assigns separate dedicated channels for use by control channels (RCC), which are defined according to frequency and bandwidth and are used for transmission from the BTS to the mobile phone A reverse voice channel (RVC), used for transmission from the mobile phone to the BTS, may occupy any channel that is not assigned to a control channel.

N-AMPS—This air interface is an expansion of the AMPS air interface protocol, and is defined in EIA/TIA standard IS-88. It uses substantially the same control channels as are used in AMPS but different voice channels with different bandwidth and modulation schemes.

TDMA—This interface, also known as D-AMPS and defined in EIA/TIA standard IS-136, is characterized by the use of both frequency and time separation. Digital Control Channels (DCCH) are transmitted in bursts in assigned timeslots that may occur anywhere in the frequency band. Digital Traffic Channels (DTC) may occupy the same frequency assignments as DCCH channels but not the same timeslot assignment in a given frequency assignment. In the cellular band, a carrier may use both the AMPS and TDMA protocols, as long as the frequency assignments for each protocol are kept separated.

CDMA—This air interface, defined by EIA/TIA standard IS-95A, is characterized by the use of both frequency and code separation. Because adjacent cell sites may use the same frequency sets, CDMA must operate under very careful power control, producing a situation known to those skilled in the art as the near-far problem, makes it difficult for most methods of wireless location to achieve an accurate location (but see U.S. Pat. No. 6,047,192, Apr. 4, 2000, Robust, Efficient, Localization System, for a solution to this problem). Control channels (known in CDMA as Access Channels) and Traffic Channels may share the same frequency band but are separated by code.

GSM—This air interface, defined by the international standard Global System for Mobile Communications, is characterized by the use of both frequency and time separation. GSM distinguishes between physical channels (the timeslot) and logical channels (the information carried by the physical channels). Several recurring timeslots on a carrier constitute a physical channel, which are used by different logical channels to transfer information—both user data and signaling.

Control channels (CCH), which include broadcast control channels (BCCH), Common Control Channels (CCCH), and Dedicated Control Channels (DCCH), are transmitted in bursts in assigned timeslots for use by CCH. CCH may be assigned anywhere in the frequency band. Traffic Channels (TCH) and CCH may occupy the same frequency assignments but not the same timeslot assignment in a given frequency assignment. CCH and TCH use the same modulation scheme, known as GMSK. The GSM General Packet Radio Service (GPRS) and Enhanced Data rates for GSM Evolution (EDGE) systems reuse the GSM channel structure, but can use multiple modulation schemes and data compression to provide higher data throughput. GSM, GPRS, and EDGE radio protocols are subsumed by the category known as GERAN or GSM Edge Radio Access Network.

UMTS—Properly known as UTRAN (UMTS Terrestrial Radio Access Network), is an air interface defined by the international standard third Generation Partnership program as a successor to the GERAN protocols. UMTS is also sometimes known as WCDMA (or W-CDMA), which stands for Wideband Code Division Multiple Access. WCDMA is direct spread technology, which means that it will spread its transmissions over a wide, 5 MHz carrier.

The WCDMA FDD (Frequency Division Duplexed) UMTS air interface (the U-interface) separates physical channels by both frequency and code. The WCDMA TDD (Time Division Duplexed) UMTS air interface separates physical channels by the use of frequency, time, and code. All variants of the UMTS radio interface contain logical channels that are mapped to transport channels, which are again mapped to W-CDMA FDD or TDD physical channels. Because adjacent cell sites may use the same frequency sets, WCDMA also uses very careful power control to counter the near-far problem common to all CDMA systems. Control channels in UMTS are known as Access Channels whereas data or voice channels are known as Traffic Channels. Access and Traffic Channels may share the same frequency band and modulation scheme but are separated by code. Within this specification, a general reference to control and access channels, or voice and data channels, shall refer to all types of control or voice and data channels, whatever the preferred terminology for a particular air interface. Moreover, given the many types of air interfaces (e.g., IS-95 CDMA, CDMA 2000, UMTS, and W-CDMA) used throughout the world, this specification does not exclude any air interface from the inventive concepts described herein. Those skilled in the art will recognize other interfaces used elsewhere are derivatives of or similar in class to those described above.

GSM networks present a number of potential problems to existing Wireless Location Systems. First, wireless devices connected to a GSM/GPRS/UMTS network rarely transmit when the traffic channels are in use. The use of encryption on the traffic channel and the use of temporary nicknames (Temporary Mobile Station Identifiers (TMSI)) for security render radio network monitors of limited usefulness for triggering or tasking wireless location systems. Wireless devices connected to such a GSM/GPRS/UMTS radio network merely periodically "listen" for a transmission to the wireless device and do not transmit signals to regional receivers except during call setup, voice/data operation, and call breakdown. This reduces the probability of detecting a wireless device connected to a GSM network. It may be possible to overcome this limitation by actively "pinging" all wireless devices in a region. However, this method places large stresses on the capacity of the wireless network. In addition, active pinging of wireless devices may alert mobile device users to the use of the location system, which can reduce the effectiveness or increase the annoyance of a polling location-based application.

The above-cited application Ser. No. 11/198,996, "Geo-Fencing in a Wireless Location System," describes methods and systems employed by a wireless location system to locate a wireless device operating in a defined geographic area served by a wireless communications system. In such a system, a geo-fenced area may be defined, and then a set of predefined signaling links of the wireless communications system may be monitored. The monitoring may also include detecting that a mobile device has performed any of the following acts with respect to the geo-fenced area: (1) entered the geo-fenced area, (2) exited the geo-fenced area, and (3) come within a predefined degree of proximity near the geo-fenced area. In addition, the method may also include, in response to detecting that the mobile device has performed at least one of these acts, triggering a high-accuracy location function for determining the geographic location of the mobile device. The present application describes methods and systems for using the concept of a geo-fenced area to enable, selectively enable, limit, deny, or delay certain functions or services based on the calculated geographic location and a pre-set location area defined by local, regional, or national legal jurisdictions. The present invention, however, is by no means limited to systems employing the geo-fencing technologies described in the above-cited application Ser. No. 11/198,996.

SUMMARY

The following summary provides an overview of various aspects of exemplary implementations of the invention. This summary is not intended to provide an exhaustive description of all of the important aspects of the invention, or to define the scope of the invention. Rather, this summary is intended to serve as an introduction to the following description of illustrative embodiments.

With the increase in gaming and the increase in wireless networks, interest in wireless device-based gaming is rising. In the present application, we describe, among other things, a wireless user interface device, application server, and location service to enable legal wireless gaming. The ability to independently locate the wireless device serves to eliminate location spoofing and assures authorities that the gaming transaction is limited to licensed jurisdictions.

The illustrative embodiments described herein provide methods and apparatus for locating wireless devices, and enabling, selectively enabling, limiting, denying, or delaying certain functions or services based on the calculated geographic location and a pre-set location area defined by user definitions; service area; billing zones; or local, regional, or national political boundaries or legal jurisdictions. Wireless devices include those such as used in analog or digital cellular systems, personal communications systems (PCS), enhanced specialized mobile radios (ESMRs), wide-area-networks (WANs), networks of localized radios (WiFi, UWB, RFID) and other types of wireless communications systems. Affected functions or services can include those either local to the wireless device or performed on a server or server network. More particularly, but not exclusively, we describe the use of wireless device location estimates with jurisdiction sensitive gaming, wagering, or betting laws or regulations to determine if the gaming functionality of a wireless device can be enabled.

In addition, we describe herein a user plane approach to network-based wireless location. Current U-TDOA solutions are often based on the so-called control plane architecture, which can require extensive modifications of the mobile network infrastructure in line with the ANSI/3GPP location services standards (for example, ANSI/ETSI J-STD-036 and ANSI ESTI GSM 03.17).

The control plane approach involves the use of information conveyed in the control or voice channels (also known respectively as the access channel and traffic channels, among other names) to locate the mobile device. In contrast, in a "user plane" architecture, the location server can communicate directly with the mobile device via a data or IP (Internet Protocol) link carried by the wireless operator's radio network but not part of the control/voice (or access/traffic) channel structures, thus requiring no modifications to the core or radio network. Both the user-plane and control-plane implementations of the LDP can co-exist on the same wireless radio network where network-based U-TDOA receivers are deployed.

One aspect of the present invention is that it may be used to instruct the WLS how to locate the LDP Device. In the control plane approach, the WLS waits for information from the wireless communications network before calculating a position, whether via U-TDOA, Cell-ID, Cell-ID+Sector, or Cell-ID with Power Difference of Arrival. In this inventive user plane approach, the LDP Device provides to the LES (also called the Location Enabling Server, or LES) sufficient information over the data channel to perform the location calculation. The information provide to the LES is known to the mobile device (i.e., LDP Device) and this knowledge is leveraged to facilitate the location calculation. In addition, the mobile information can also be used for tasking, for example, to task the U-TDOA/AoA WLS since the information sent over the data connection can include serving cell, neighboring cells, frequency, and hopping pattern information. In the prior control plane approach, this information is obtained from the network via the E5, Lb or $I_{upc}$ interface (for example) and not from the mobile over a data channel.

To perform an enhanced network-based location, an LDP Device 110 may be configured to receive broadcast acquisition data, register on the system (if required) and request data service from the wireless network. The data connection may be routed by the data network to the LES 220. Upon connection with the LES, the LDP Device 110 can then transmit its ID, channel information, neighbor (for instance, the mobile-assisted-handoff (MAHO) list, any encryption bit-string given to the LDP Device by the network, and a known, preferably semi-random, sequence to send over the existing data path. This semi-random sequence can then be retransmitted until commanded to stop either by internal counters/timers or by the LES 220. The MAHO list may contain information on the surrounding cell sites/sectors ("targets") needed by the network to perform a handover to a new cell or sector. For example, the target network station (e.g., BTS or sector), target channel, target time offset, power offset, etc., may be included in the MAHO list. The LES may select the network receiver stations based on the received channels and receiver stations available in the neighbor (e.g., MAHO) list (if any) or from internal tables of stations locations. The network-based wireless location system may then perform a location to the threshold of accuracy required by the quality of service demanded. The LES can use the established duplex data path with the LDP Device to update LDP timers, ID, programming, or other characteristics. The LES can then command the LDP Device 110 based on location, CellID, mode, band, or RF protocol. During the network based location, the LES can command the LDP to disable discontinuous transmission, or increase the transmit power to facilitate more accurate and efficient location of the device. This has particular benefit to a system employing uplink time-difference-of-arrival (U-TDOA) location algorithms. The ability to set the device transmit power to a level and at a time known to the LES also benefits location systems based on power or power-difference-of-arrival location algorithms.

Additional features and advantages of the invention will be made apparent from the following Detailed Description of Illustrative Embodiments.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 illustrates examples of potential user plane information fields.

FIG. 7 illustrates an exemplary architecture in which an LES 220 is deployed as a Location Services client (LCS) allowing the LES 220 to both interact with the GMLC 98 and communicate to the LDP 110A and 110B via a TCP/IP connection 1776 to the GGSN 46. FIG. 8 illustrates an exemplary architecture in which an LES 220 is deployed as an LCS allowing the LES 220 to both interact with the GMLC 98 and a user plane A-GPS server 666 over TCP/IP connection 1234.

DETAILED DESCRIPTION OF ILLUSTRATIVE EMBODIMENTS

A. Overview

Figure 1:
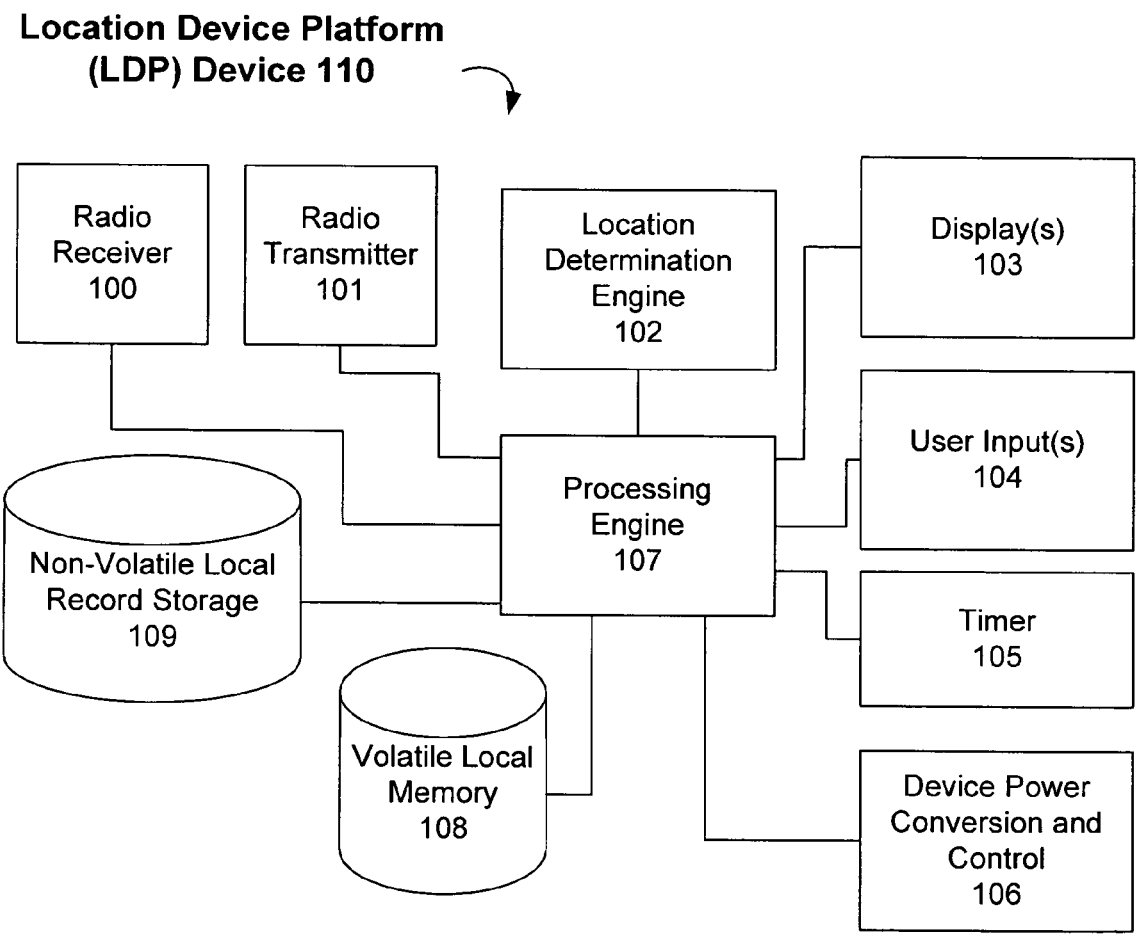
FIG. 1 schematically depicts a Location Device Platform (LDP) Device.
Figure 2:
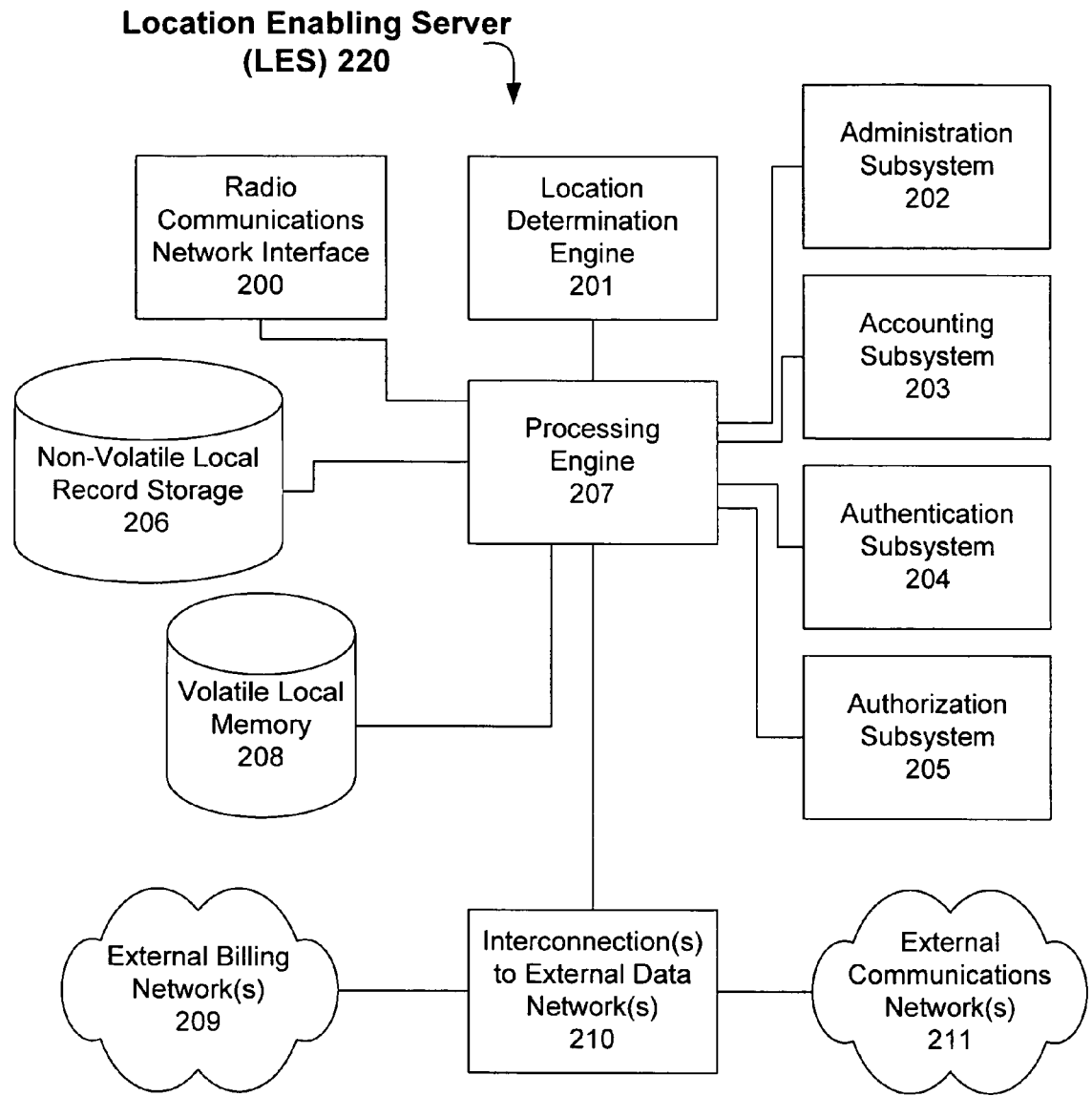
FIG. 2 schematically depicts an LES 220.

A Location Device Platform (LDP) Device 110 and LES 220 (see FIGS. 1 and 2, respectively) enable location services for any physical item. In one mode, the item is or comprises wireless communications device (cell phone, PDA, etc.) configured for the purposes of wagering. Since wagering is controlled (in the USA) by local or state regulations, the location of legal wagering is typically confined to enclosed areas such as casinos, riverboats, parimutuel tracks, or assigned off-site locations. Use of the LDP capabilities allows for wagering to take place anywhere under the control of a regulatory body.

The LDP Device 110 may be used for both purpose-built and general purpose computing platforms with wireless connections and wagering functionality. The LES 220, a location-aware server resident in a telecommunications network, can perform location checking on the wireless LDP Device 110 (analogous to existing systems checking of IP addresses or telephony area codes) to determine if wagering functionality can be enabled. The actual wagering application can be resident on the LES 220 or exist on another networked server. The LES 220 can even supply a gaming permission indicator or a geographical location to a live operator/teller.

The location methodology employed by the wireless location system may be dependent on the service area deployed or requirements from the wagering entity or regulatory authority. Network-based location systems include those using POA, PDOA, TOA, TDOA, or AOA, or combinations of these. Device-based location systems may include those using POA, PDOA, TOA, TDOA, GPS, or A-GPS. Hybrids, combining multiple network-based techniques, multiple device-based techniques, or a combination of network and device based techniques, can be used to achieve the accuracy, yield, and latency requirements of the service area or location-based service. The location-aware LES 220 may decide on the location technique to use from those available based on cost of location acquisition.

The LDP Device 110 preferably includes a radio communications link (radio receiver and transmitter 100, 101) for communicating with the LES 220. Wireless data communications may include cellular (modem, CPDP, EVDO, GPRS, etc.) or wide-area networks (WiFi, WiMAN/MAX, WiBro, ZigBee, etc.) associated with the location system. The radio communications method can be independent of the wireless location system functionality—for instance, the device may acquire a local WiFi Access Point, but then use GSM to communicate the SSID of the WiFi beacon to the LES 220 for a proximity location.

The LES 220 authenticates, authorizes, bills, and administers the use of the LDP Device 110. Preferably, the LES 220 also maintains the service area definitions and wagering rules associated with each service area. The service area may be either a polygon defined by a set of latitude/longitude points or a radius from a central point. The service area may be defined within the location-aware server by interpretation of gaming statutes. Based on the service area definition, the rules, and the calculated location, the LES 220 may grant the wireless device full access, limited access, or no access to gaming services. The LES 220 also preferably supports a geo-fencing application where the LDP Device 110 (and the wagering server) is informed when the LDP Device 110 enters or leaves a service area. The LES 220 preferably supports multiple limited access indications. Limited access to a wagering service can mean that only simulated play is enabled. Limited access to service can also mean that real multi-player gaming is enabled, but wagering is not allowed. Limited access to service may be determined by time of day or by the location combined with the time of day. Moreover, limited access to service can mean that a reservation for gaming at a particular time and within a prescribed area is made.

The LES 220 can issues a denial of service to both the LDP Device 110 and the wagering server. Denial of access can also allow for the provision of directions to where requested gaming is allowed.

The LDP Device 110 and LES 220 may allow for all online gaming and wagering activities based on card games, table games, board games, horse racing, auto racing, athletic sports, on-line RPG, and online first person shooter.

It is envisioned, but not required, that the LES 220 could be owned or controlled by a wireless carrier, a gaming organization or a local regulatory board.

We will now briefly summarize two exemplary use cases.

Use Case: Geo-Fencing

In this scenario, the LDP Device 110 is a purpose-built gaming model using GSM as the radio link and network-based Uplink-TDOA as the location technique. Handed out to passengers as they arrive at the airport, the LDP Device 110 initially supports gaming tutorials, advertisements, and simulated play. When the device enters the service area, it signals the user though audible and visual indicators that the device is now capable of actual wagering. This is an example of a geo-fencing application. Billing and winnings are enabled via credit card or can be charged/awarded to a hotel room number. If the LDP Device 110 leaves the area, audible and visual indicators show that the device is now incapable of actual wagering as the LES 220 issues a denial message to the LDP Device and wagering server.

Use Case: Access Attempt

In this scenario, the LDP Device 110 is a general purpose portable computer with a WiFi transceiver. A wagering application client is resident on the computer. Each time a wagering function is accessed, the LDP Device 110 queries the LES 220 for permission. The LES 220 obtains the current location based on the WiFi SSID and power of arrival, compares the location against the service area definition and allows or denies access to the selected wagering application. Billing and winnings are enabled via credit card.

B. LDP Device

The LDP Device 110 is preferably implemented as a location enabling hardware and software electronic platform. The LDP Device 110 is preferably capable of enhancing accuracy of a network-based wireless location system and hosting both device-based and hybrid (device and network-based) wireless location applications.

Form Factors

The LDP Device 110 may be built in a number of form-factors including a circuit-board design for incorporation into other electronic systems. Addition (or deletion) of components from the Radio Communications Transmitter/Receiver, Location Determination, Display(s), Non-Volatile Local Record Storage, Processing Engine, User Input(s), Volatile Local Memory, Device Power Conversion and Control subsystems or removal of unnecessary subsystems allow the size, weight, power, and form of the LDP to match multiple requirements.

Radio Communications—Transmitter 101

The LDP Radio Communications subsystem may contain one or more transmitters in the form of solid-state application-specific-integrated-circuits (ASICs). Use of a software defined radio may be used to replace multiple narrow-band transmitters and enable transmission in the aforementioned radio communications and location systems. The LDP Device 110 is capable of separating the communications radio link transmitter from the transmitter involved in a wireless location transmission under direction of the onboard processor or LES 220.

Radio Communications—Receiver 100

The LDP Radio Communications subsystem may contain one or more receivers in the form of solid-state application-specific-integrated-circuits (ASICs). Use of a wide-band software defined radio may be used to replace multiple narrow-band receivers and enable reception of the aforementioned radio communications and location systems. The LDP Device 110 is capable of separating the communications radio link receiver from the receiver used for wireless location purposes under direction of the onboard processor or LES 220. The LDP Radio Communications subsystem may also be used to obtain location-specific broadcast information (such as transmitter locations or satellite ephemeredes) or timing signals from the communications network or other transmitters.

Location Determination Engine 102

The Location Determination Engine, or subsystem, 102 of the LDP Device enables device-based, network-based, and hybrid location technologies. This subsystem can collect power and timing measurements, broadcast positioning information and other collateral information for various location methodologies, including but not limited to: device-based time-of-arrival (TOA), forward link trilateration (FLT), Advanced-forward-link-trilateration (AFLT), Enhanced-forward-link-trilateration (E-FLT), Enhanced Observed Difference of Arrival (EOTD), Observed Time Difference of Arrival (O-TDOA), Global Positioning System (GPS) and Assisted GPS (A-GPS). The location methodology may be dependent on the characteristics of the underlying radio communications or radio location system selected by the LDP or LES 220.

The Location Determination subsystem can also act to enhance location in network-based location systems by modifying the transmission characteristics of the LDP Device 110 to maximize the device's signal power, duration, bandwidth, and/or delectability (for instance, by inserting a known pattern in the transmitted signal to enable the network-based receiver to use maximum likelihood sequence detection).

Display(s) 103

The display subsystem of the LDP Device, when present, may be unique to the LDP and optimized for the particular location-application the device enables. The display subsystem may also be an interface to another device's display subsystem. Examples of LDP displays may include sonic, tactile or visual indicators.

User Input(s) 104

The User Input(s) subsystem 104 of the LDP Device, when present, may be unique to the LDP Device and optimized for the particular location-application the LDP Device enables. The User Input subsystem may also be an interface to another device's input devices.

Timer 105

The timer 105 provides accurate timing/clock signals as may be required by the LDP Device 110.

Device Power Conversion and Control 106

The Device Power Conversion and Control subsystem 106 acts to convert and condition landline or battery power for the other LDP Device's electronic subsystems.

Processing Engine 107

The processing engine subsystem 107 may be a general purpose computer that can be used by the radio communication, displays, inputs, and location determination subsystems. The processing engine manages LDP Device resources and routes data between subsystems and to optimize system performance and power consumption in addition to the normal CPU duties of volatile/non-volatile memory allocation, prioritization, event scheduling, queue management, interrupt management, paging/swap space allocation of volatile memory, process resource limits, virtual memory management parameters, and input/output (I/O) management. If a location services application is running local to the LDP Device 110, the processing engine subsystem 107 can be scaled to provide sufficient CPU resources.

Volatile Local Memory 108

The Volatile Local Memory subsystem 108 is under control of the processing engine subsystem 107, which allocates memory to the various subsystems and LDP Device resident location applications.

Non-Volatile Local Record Storage 109

The LDP Device 110 may maintain local storage of transmitter locations, receiver locations or satellite ephemeredes in non-volatile local record storage 109 through power-down conditions. If the location services application is running local to the LDP Device, application specific data and application parameters such as identification, ciphering codes, presentation options, high scores, previous locations, pseudonyms, buddy lists, and default settings can be stored in the non-volatile local record storage subsystem.

C. Location Aware Application Enabling Server (LES) 220

The LES 220 (see FIG. 2) provides the interface between the wireless LDP Devices 110 and networked location-based services applications. In the following paragraphs we describe the components of the illustrative embodiment depicted in FIG. 2. It should be noted that the various functions described are illustrative and are preferably implemented using computer hardware and software technologies, i.e., the LES is preferably implemented as a programmed computer interfaced with radio communications technologies.

Radio Communications Network Interface 200

The LES 220 connects to the LDP Device 110 by a data link running over a radio communications network either as a modem signal using systems such as, but not limited to: CDPD, GPRS, SMS/MMS, CDMA-EVDO, or Mobitex. The Radio Communications Network Interface (RCNI) subsystem acts to select and commands the correct (for the particular LDP) communications system for a push operation (where data is sent to the LDP Device 110). The RCNI subsystem also handles pull operations where the LDP Device 110 connects the LES 220 to initiate a location or location-sensitive operation.

Location Determination Engine 201

The Location Determination Engine subsystem 201 allows the LES 220 to obtain LDP Device 110 location via network-based TOA, TDOA, POA, PDOA, AoA or hybrid device and network-based location techniques.

Administration Subsystem 202

The Administration subsystem 202 maintains individual LDP records and services subscription elections. The LES 220 Administration subsystem allows for arbitrary groupings of LDP Devices to form services classes. LDP subscriber records may include ownership; passwords/ciphers; account permissions; LDP Device 110 capabilities; LDP make, model, and manufacturer; access credentials; and routing information. In the case where the LDP Device is a registered device under a wireless communication provider's network, the LES 220 administration subsystem preferably maintains all relevant parameters allowing for LDP access of the wireless communication provider's network.

Accounting Subsystem 203

The LDP Accounting subsystem 203 handles basic accounting functions including maintaining access records, access times, and the location application accessing the LDP Device location allowing for charging for individual LDP Device and individual LBS services. The Accounting subsystem also preferably records and tracks the cost of each LDP access by the wireless communications network provider and the wireless location network provider. Costs may be recorded for each access and location. The LES 220 can be set with a rules-based system for the minimization of access charges via network and location system preference selection.

Authentication Subsystem 204

The main function of the Authentication subsystem 204 is to provide the LES 220 with the real-time authentication factors needed by the authentication and ciphering processes used within the LDP network for LDP access, data transmission and LBS-application access. The purpose of the authentication process is to protect the LDP network by denying access by unauthorized LDP Devices or by location-applications to the LDP network and to ensure that confidentiality is maintained during transport over a wireless carrier's network and wireline networks.

Authorization Subsystem 205

The Authorization subsystem 205 uses data from the Administration and Authentication subsystems to enforce access controls upon both LDP Devices and Location-based applications. The access controls implemented may be those specified in Internet Engineering Task Force (IETF) Request for Comment RFC-3693, "Geopriv Requirements," the Liberty Alliance's Identity Service Interface Specifications (ID-SIS) for Geo-location, and the Open Mobile Alliance (OMA).

The Authorization subsystem may also obtain location data for an LDP Device before allowing or preventing access to a particular service or Location-based application. Authorization may also be calendar or clock based dependent on the services described in the LDP profile record resident in the administration subsystem. The Authorization system may also govern connections to external billing system and networks, denying connections to those networks that are not authorized or cannot be authenticated.

Non-Volatile Local Record Storage 206

The Non-Volatile Local Record Storage of the LES 220 is primarily used by the Administration, Accounting, and Authentication subsystems to store LDP profile records, ciphering keys, WLS deployments, and wireless carrier information.

Processing Engine 207

The processing engine subsystem 207 may be a general purpose computer. The processing engine manages LES resources and routes data between subsystems.

Volatile Local Memory 208

The LES 220 has a Volatile Local Memory store composed of multi-port memory to allow the LES 220 to scale with multiple, redundant processors.

External Billing Network(s) 209

Authorized External billing networks and billing mediation system may access the LDP accounting subsystem database through this subsystem. Records may also be sent periodically via a pre-arranged interface.

Interconnection(s) to External Data Network(s) 210

The interconnection to External Data networks is designed to handle conversion of the LDP data stream to external LBS applications. The interconnection to External Data networks is also a firewall to prevent unauthorized access as described in the Internet Engineering Task Force (IETF) Request for Comment RFC-3694, "Threat Analysis of the Geopriv Protocol." Multiple access points resident in the Interconnection to External Data Networks subsystem 210 allow for redundancy and reconfiguration in the case of a denial-of-service or loss of service event. Examples of interconnection protocols supported by the LES 220 include the Open Mobile Alliance (OMA) Mobile-Location-Protocol (MLP) and the Parlay X specification for web services; Part 9: Terminal Location as Open Service Access (OSA); Parlay X web services; Part 9: Terminal location (also standardized as 3GPP TS 29.199-09).

External Communications Network(s) 211

External Communications Networks refer to those networks, both public and private, used by the LES 220 to communicate with location-based applications not resident on the LES 220 or on the LDP Device 110.

D. System/Process for Gaming

Figure 3:
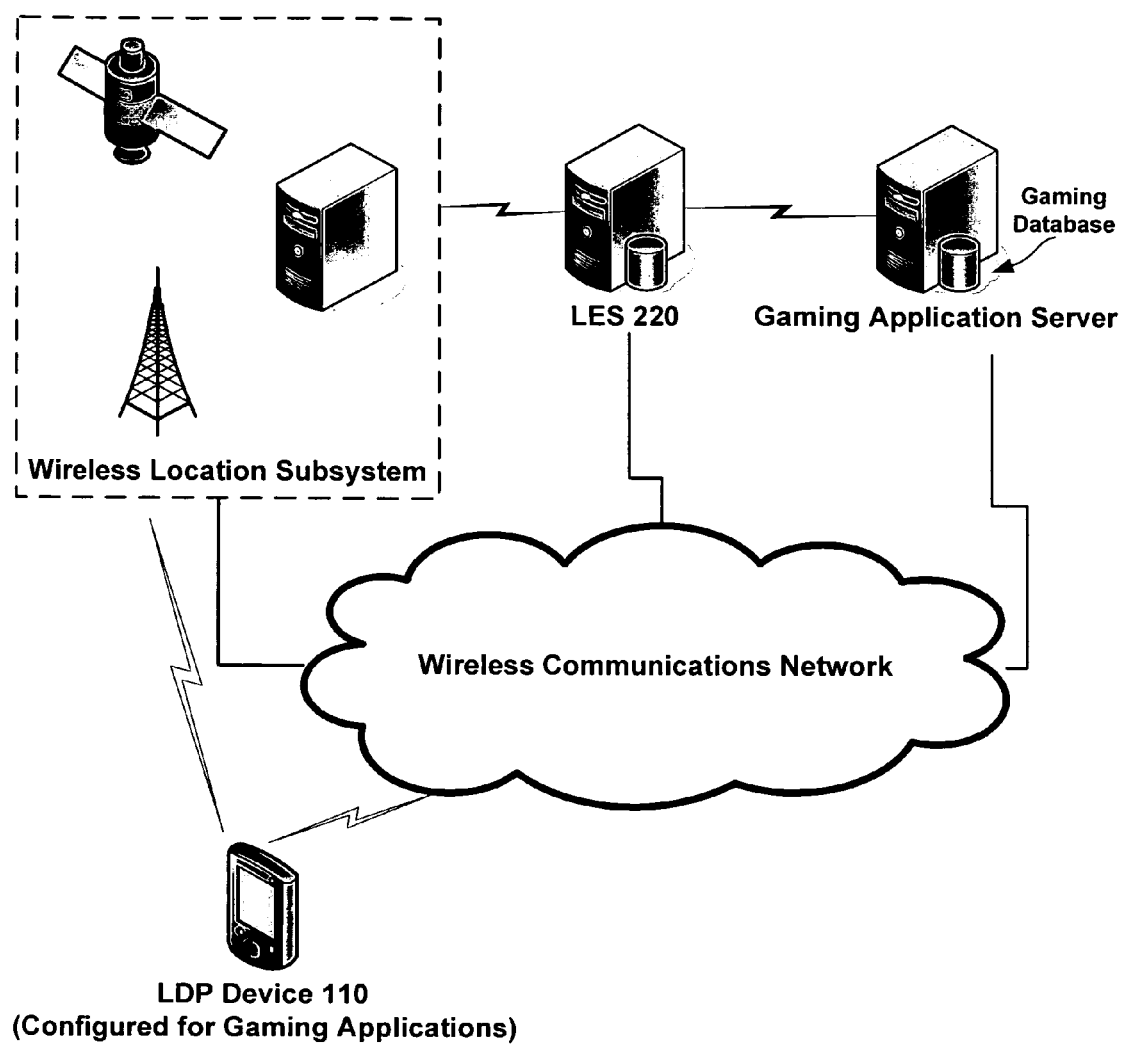
FIG. 3 schematically depicts a system in accordance with the following description.

FIG. 3 illustrates a system in accordance with one embodiment of the present invention. As shown, such a system includes one or more LDP Devices 110 and an LES 220. The LDP Devices 110 may be configured for gaming applications of the type that are typically regulated by state and local governmental agencies. As discussed above, an LDP Device may comprise a conventional mobile computing device (e.g., PDA), a mobile digital phone, etc., or may be a special purpose device dedicated to gaming. The LDP Device 110 has the capability to provide a user with wireless access to an Internet-based gaming application server. Such access may be provided via a wireless communications network (cellular, WiFi, etc.), as shown. In this implementation of the system, the gaming application server includes or is coupled to a database of gaming information, such as information describing the geographic regions where wagering is permitted.

As shown in FIG. 3, the LES 220 and Gaming Application Server are operatively coupled by a communications link, so that the two devices may communicate with one another. In this embodiment, the LES 220 is also operatively coupled to a wireless location system, which, as discussed herein, may be any kind of system for determining the geographic location of the LDP Devices 110. It is not necessary that the LDP Devices be located with the precision required for emergency (e.g., E911) services, but only that they be located to the extent necessary to determine whether the devices are in an area where wagering is permitted.

Figure 4:
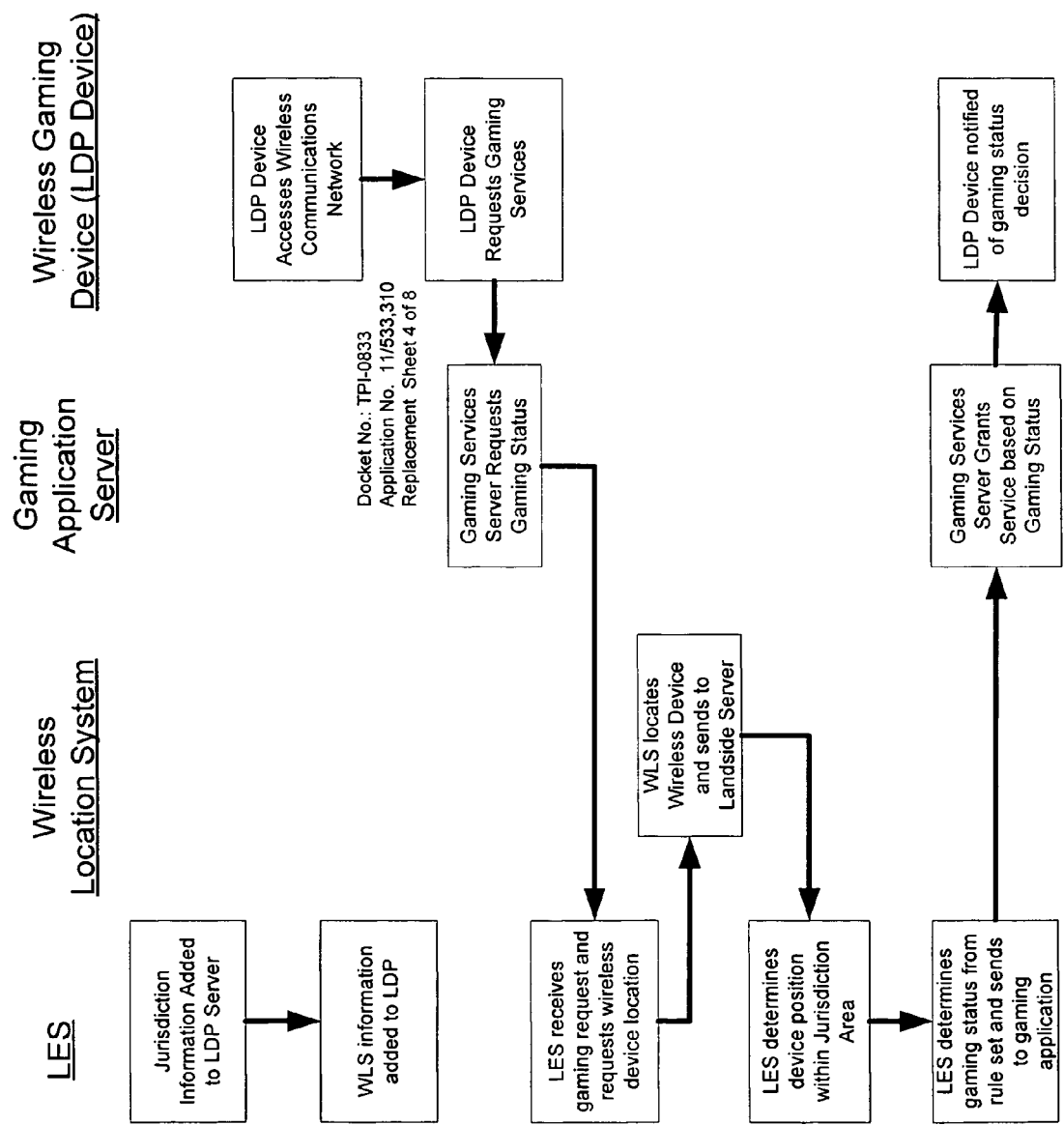
FIG. 4 is a flowchart illustrating a process in accordance with the following description.

Referring now to FIG. 4, in one exemplary implementation of the invention, the LES is provided with gaming jurisdictional information and well as information provided by the wireless location system. The precise details of what information is provided to the LES will depend upon the precise details of what kinds of services the LES is to provide.

As shown in FIG. 4, the LDP Device accesses the wireless communications network and requests access to gaming services. This request is routed to the gaming application server, and the gaming application server in turn requests location information from the LES 220. The LES requests the WLS to locate the LDP Device, and the WLS returns the location information to the LES 220. In this implementation of the invention, the LES determines that the LDP Device is within a certain predefined jurisdictional area, and then determines whether gaming/wagering services should be provided (alternatively, this determination could be made the responsibility of the gaming application server). This information is provided to the gaming application server, and the gaming application server notifies the LDP Device of the determined gaming status decision (i.e., whether gaming services will or will not be provided).

E. Other Embodiments

LDP Power Savings Through Selective Awake Mode

Wireless devices typically have three modes of operation to save battery life: sleep, awake (listen), and transmit. In the case of the LDP Device 110, a fourth state, locate, is possible. In this state, the LDP Device 110 comes first to the awake state. From received data or external sensor input, the LDP Device determines if activation of the Location Determination Engine or Transmission subsystem is required. If the received data or external sensor input indicates a location transmission is not needed, then the LDP Device 110 powers neither the location determination or transmission subsystems and returns to the minimal power drain sleep mode. If the received data or external sensor input indicates a location transmission is needed only if the device position has changed, then the LDP Device 110 will perform a device-based location and returns to the minimal power drain sleep mode. If the received data or external sensor input indicates a location transmission is necessary, then the LDP Device 110 may perform a device-based location determination, activate the transmitter, send the current LDP Device 110 location (and any other requested data) and return to the minimal power drain sleep mode. Alternatively, if the received data or external sensor input indicates a location transmission is necessary, then the LDP Device 110 may activate the transmitter, send a signal (optimized for location) to be located by network-means (the LDP Device 110 may send any other requested data at this time) and then return to the minimal power drain sleep mode.

Invisible Roaming for Non-Voice Wireless LDPs

For LDP Devices using cellular data communications, it is possible to provision the LDP Devices for minimal impact to existing cellular authentication, administration, authorization and accounting services. In this scenario, a single LDP platform is distributed in each cellular base station footprint (within the cell-site electronics). This single LDP Device 110 is then registered normally with the wireless carrier. All other LDPs in the area would then use SMS messages for communication with the LES 220 (which has its own authentication, administration, authorization and accounting services) based on the single LDP ID (MIN/ESN/IMSI/TMSI) to limit HLR impact. A server would use the payload of the SMS to determine both the true identity of the LDP and also the triggering action, location or attached sensor data.

SMS Location Probes Using a Known Pattern Loaded into the LDP

Using SMS messages with a known pattern of up to 190 characters in a deployed WLS control channel location architecture or A-bis monitored system the LDP Device 110 can enhance the location of an SMS transmission. Since characters are known, the encryption algorithm is known, the bit pattern can be generated and the complete SMS message is available for use as an ideal reference by signal processing to remove co-channel interference and noise to increase the precision possible in a location estimation.

Location Data Encryption for Privacy Distribution and Non-Repudiation.

A method for enforcement of privacy, re-distribution and billing non-repudiation using an encryption key server based in the LES 220 may be employed. In this method, the LES 220 would encrypt the location record before delivery to any outside entity (the master gateway). The gateway can either open the record or pass the protected record to another entity. Regardless of the opening entity, a key would have to be requested from the LES 220 key server. The request for this key (for the particular message sent) means that the "private" key "envelope" was opened and the location sequence number (a random number allocated by the LES 220 to identify the location record) read by the entity. The LES 220 would then deliver a "secret" key and the subscriber's location under the same "private" key repeating the location sequence number to allow reading of the location record. In this manner subscriber privacy is enforced, gateways can redistribute location records without reading and recording the data, and receipt of the record by the final entity is non-reputable.

Overlay Network-Based Location Enhancement Via Data Channel 300

Figure 5:
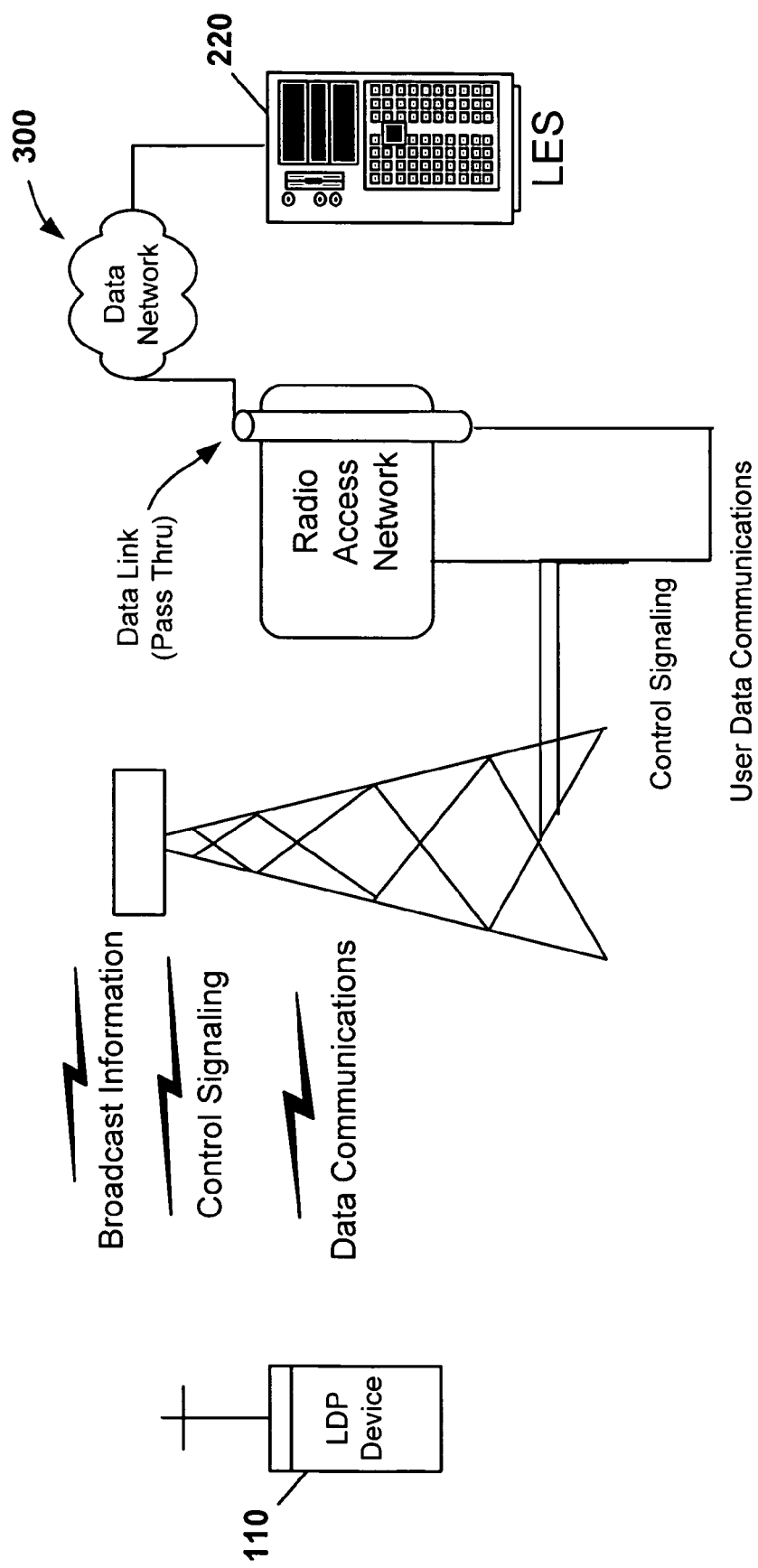
FIG. 5 schematically illustrates how a mobile wireless device, such as LDP device, may be configured to communicate via a data channel with a server, such as an LES, to provide to the server information useful in tasking a wireless location system.

To perform an enhanced network-based location, the LDP Device 110 may be configured to receive broadcast acquisition data, register on the wireless communications system (if required) and then request data service from the wireless network to establish a data link or channel 300 as shown in FIG. 5. In contrast to the control channels and signaling of the wireless communications system (the control plane), the data channel 300 (the user plane) supports a modulation to support data transmissions (data signaling is not re-encoded and compressed by the wireless communications system as with voice signaling, but rather passes though the wireless system as shown in FIG. 5). The payload contents of the data channel 300 do not require examination or modification by the functional elements of the wireless communications system. The data channel payload does not inform, control, or modify the operations of the elements of the wireless communications system as does control channel data. The data channel 300 may be carried as payload in an assigned data channel either as raw binary data or in a voice channel as a series of voice frequency tones.

The data connection is routed by the data network (reference numeral 300 in FIG. 5) to the LES 220. Upon connection with the LES 220, the LDP Device 110 then immediately transmits its ID (examples include: MIN/ESN/TMSI/TruePosition), its channel information (examples include: Channel, CC, etc); its neighbor (for instance, the mobile-assisted-handoff (MAHO) list (containing the target network station, target channel, target time offset, power offset, etc.); any encryption bit-string given to the LDP Device 110 by the network, and a semi random-but-known pattern to send over the existing data channel 300.

It should be noted that it is not required that the data be semi-random. Any data could be used, although the use of semi-random data improves efficiency. This is because a pseudo- or semi-random sequence improves the accuracy (efficiency) of a location by providing a flatter cross-spectrum and reducing the level of side-lobes in the correlation function used to determine the TDOA value. A reduction in the side-lobes can reduce the likelihood of an incorrect time estimation.

This semi-random sequence is retransmitted on a (n) second repeat period (the (n) second repeat can be matched to the availability of the MAHO list) until commanded to stop either by internal counters/timers or by the LES 220. The LES 220 selects the network receiver stations based on the received channels and receiver stations available in the neighbor (MAHO) list (if any) or from internal tables of stations locations. The network-based wireless location then performs a location up to the threshold of accuracy required by the quality of service demanded.

The MAHO list may contain information on the surrounding cell sites/sectors ("targets") needed by the network to perform a handover to a new cell or sector. For example, the target network station (e.g., BTS or sector), target channel, target time offset, power offset, etc., may be included in the MAHO list. The LES may select the network receiver stations based on the received channels and receiver stations available in the neighbor (e.g., MAHO) list (if any) or from internal tables of stations locations.

The LES 220 can use the established duplex data path with the LDP Device 110 to update the LDP timers, ID, programming, or other characteristics. LDP timers, ID or other characteristics include various things: The LDP Device can sleep for very long periods to save battery life and may wake up only once a day or once a week. LDP timers may be used for this purpose. The ID of the LDP may be changed as the LDP is re-tasked for new duties or for new owners. The other characteristics can include, among other things, the pseudo-random sequence, encryption keys, firmware or software updates.

The LES 220 can then command the LDP Device 110 based on location, CellID, mode, band, or RF protocol. During the network-based location process, the LES can command the LDP to disable discontinuous transmission or increase the transmit power to facilitate more accurate and efficient location of the device. This has particular benefit to a system employing uplink time-difference-of-arrival (U-TDOA) location algorithms. The ability to set the device transmit power to a level and at a time known to the LES also benefits location systems based on power or power-difference-of-arrival location algorithms.

The cellular system signaling, voice, and/or data encryption is irrelevant to this application since that data can be delivered in the data path to the WLS for use.

Published U.S. Patent Application No. US20050206566A1, "Multiple Pass Location Processor," filed on May 5, 2005, is a continuation of U.S. application Ser. No. 10/915,786, filed Aug. 11, 2004, entitled "Multiple Pass Location Processor," now U.S. Pat. No. 7,023,383, issued Apr. 4, 2006, which is a continuation of U.S. application Ser. No. 10/414,982, filed Apr. 15, 2003, entitled "Multiple Pass Location Processor," now U.S. Pat. No. 6,873,290 B2, issued Mar. 29, 2005, which is a continuation-in-part of U.S. patent application Ser. No. 10/106,081, filed Mar. 25, 2002, entitled "Multiple Pass Location Processing," now U.S. Pat. No. 6,603,428 B2, issued Aug. 5, 2003, which is a continuation of U.S. patent application Ser. No. 10/005,068, filed on Dec. 5, 2001, entitled "Collision Recovery in a Wireless Location System," now U.S. Pat. No. 6,563,460 B2, issued May 13, 2003, which is a divisional of U.S. patent application Ser. No. 09/648,404, filed on Aug. 24, 2000, entitled "Antenna Selection Method for a Wireless Location System," now U.S. Pat. No. 6,400,320 B1, issued Jun. 4, 2002, which is a continuation of U.S. patent application Ser. No. 09/227,764, filed on Jan. 8, 1999, entitled "Calibration for Wireless Location System," now U.S. Pat. No. 6,184,829 B1, issued Feb. 6, 2001. The pending Published U.S. Patent Application No. US20050206566A1 includes a discussion of how the "MobileInformation" field came to be included in the ANSI/ETSI joint standard J-STD-036. For example, the following discussion is provided:

> Of course, if the cell/sector density itself is sufficient to achieve the accuracy required in the first-pass quality-of-service parameters, the system can return that value. If the location estimate yielded by cell and sector is not sufficiently accurate, the WLS system can combine the cell and sector with carrier network-supplied or mobile station-supplied timing information (round-trip-delay, timing advance in TDMA systems such as IS-54, IS-136 and GSM or PN-offset in CDMA systems) or carrier network-supplied or mobile station-supplied power measurements to generate a first location estimate exceeding the first set of quality-of-service parameters.
>
> If the first pass location method, whatever the technology used, exceeds the first and second set of quality-of-service parameters, then the second pass may be aborted, saving location receiver resources. If the second pass is aborted, then the requesting application can either receive just the first pass response or both the second and first pass responses according to prearrangement or notification that a second response will not be delivered by a flag or indicator in the first pass response.
>
> A further aspect of the present invention includes the notion that multipass location processing may be divided into three parts: (1) selection of multipass processing, (2) performance of multipass processing, and (3) identification. These are discussed further below.
>
> [ . . . ]
>
> It should be noted that J-STD-036, first published in August 2000, is a joint ANSI/ETSI standard conceived to establish a single common interface between the wireless carrier and the local public safety provider of emergency call (9-1-1) response. The assignee of the present invention, TruePosition, Inc., contributed to the standard but concentrated on the interface between the carrier and the location network specific elements. A number of information elements were therefore supplied to the location system in case they would be useful in the future. These parameters may be included in the "MobileInformation" field generated by the wireless carrier from both wireless network equipment and transmissions received from the wireless device. When it became apparent that traffic channel systems would not provide a location estimate in a timely manner, a multi-pass location method was implemented as disclosed in U.S. Pat. No. 6,184,829 B1, Feb. 6, 2001. The use of MobileInformation supplied parameters and the multi-pass location approach allows a network-based system to offer varying quality-of-service and increases the efficiency and reliability of the system in the production of location estimates for both emergency and other services. This invention may also be advantageously employed in handset-based solutions.

Known U-TDOA solutions are based on the control plane architecture, which can require extensive modifications of the mobile network infrastructure in line with the ANSI/3GPP location services standards. In contrast, in a user plane architecture, the location server can communicate directly with the mobile device via a data or IP (Internet Protocol) channel 300 carried by the wireless operator's radio network (see FIG. 5), thus requiring no modifications to the core or radio network. Both the user plane and control plane implementations of the LDP can co-exist on the same wireless radio network where network-based U-TDOA receivers are deployed. Where network-based receivers are not deployed and control-plane is not implemented, the LDP and LDPO server can still develop and deliver cell ID and ECID location capability using the user-plane technique. The same tasking and tuning information is needed by the U-TDOA location system to perform signal collection and location estimation in both the control-plane and user-plane architectures. An example of the information defined for a control plane U-TDOA systems is contained the J-STD-036 defined MobileInformation field. Identical information as contained in the MobileInformation field as currently defined may be sent via a data channel to the LES 220.

Accordingly, an aspect of the system described herein is that it may be used to instruct the WLS how to locate the LDP Device. Unlike the control plane approach, wherein the WLS receives information from the wireless communications network before calculating a position, with the user plane approach, the LDP Device provides to the LES sufficient information over the data channel to perform the location calculation. The information provided to the LES is employed to facilitate the location calculation. The information can also be used for tasking, for example, to task the WLS based on serving cell, neighboring cells, frequency, and hopping pattern information. In the prior control plane approach, this information is obtained from the network via the E5, Lb or $I_{upc}$ interface (for example) and not from the mobile over a data channel.

Figure 7:
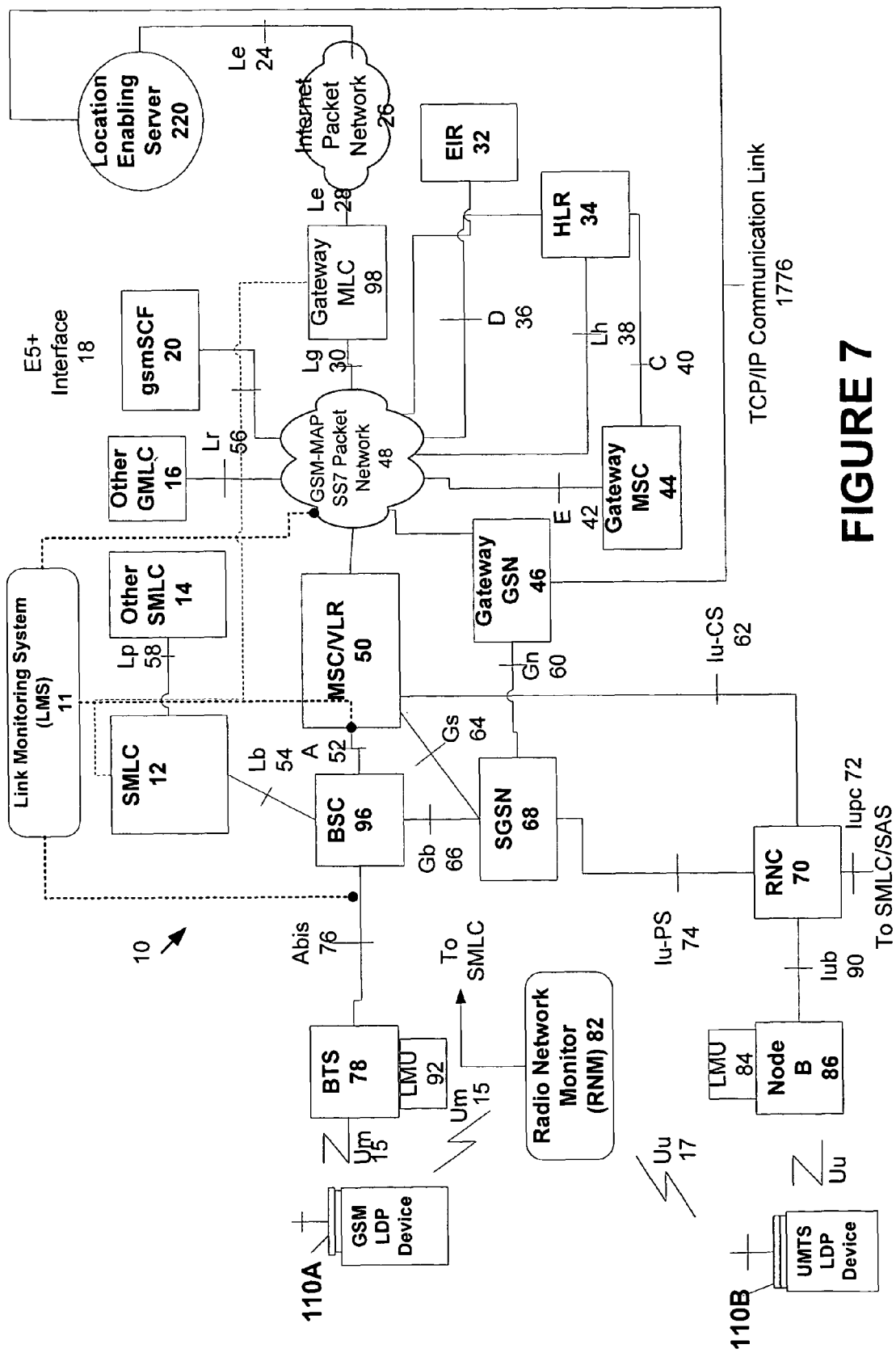
FIGS. 7 and 8 illustrates exemplary architectures for a GERAN/UTRAN network reference in which an LES 220 is deployed as a Location Services client (LCS).
Figure 8:
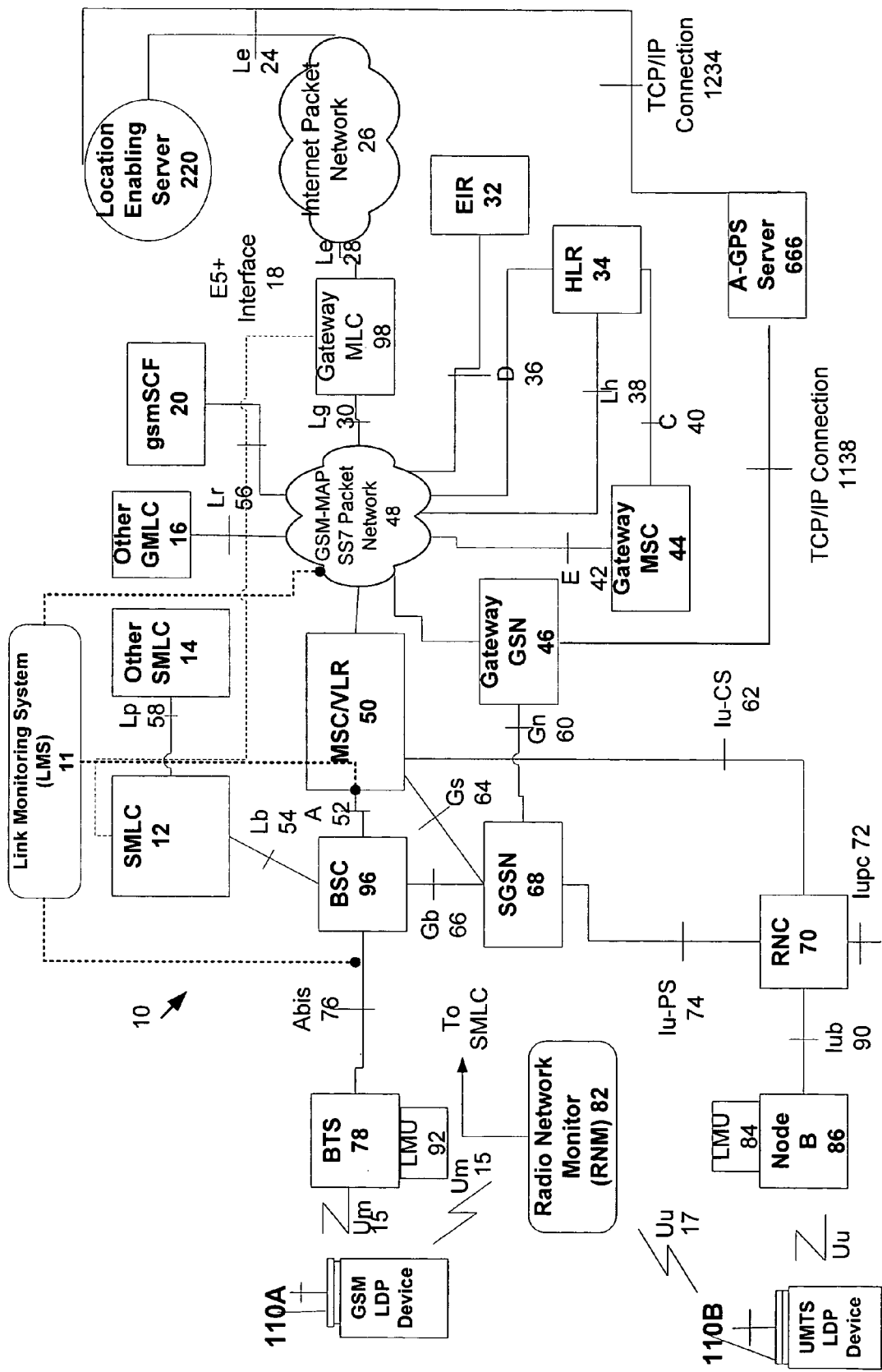

FIG. 6 illustrates examples of potential user plane information fields. Any of these may be potentially useful in tasking the wireless location system, and so they may be included in the information communicated by the wireless device, via the data channel, to the LES 220. It should be noted that some of these parameters are used to select specific U-TDOA receivers (serving cell, neighbor cells) while other parameters are used to tune the receivers (actual radio frequency, frame, timeslot, hop pattern, modulation scheme). Other parameters are used to demodulate the signal enough to pull out the control signaling and error coding (encryption key, error coding and correction). Some of these exist in the existing Network Measurement Report, NMR, mobile-assisted handoff (MAHO) message. Others are known to the mobile receiver or are programmable into the LDP device. Moreover, there is a fourth type of parameters that allow one to fallback from U-TDOA. These are cell/sector ID (CGI), cell/sector ID with timing advance (CGI+TA), and cell/sector ID with timing advance with a power-difference-of-arrival based on the neighbors' signal strength measurements provided in the NMR. Besides providing a fallback, these parameters allow for sanity checking of the U-TDOA solution. These parameters can also be used to constrain the TDOA/FDOA search space in the U-TDOA algorithms. The list of parameters includes:

A. Event Related Information
   a. Event Timestamp
   b. Event Type (Trigger)
   c. Originator (Application Name)
B. Mobile or Subscriber Related Information
   a. MS-ISDN
   b. IMEI
   c. IMSI
C. Conversation Related Information
   a. Calling Number
   b. Called Number
D. Serving Cell and Radio Related Information
   a. Serving Cell—CGI
   b. Serving Cell—ARFCN
   c. Serving Cell—BSIC (Base Station Identification Code)
   d. Prior Cell—CGI and TA (for handover event)
   e. Uplink Receive Level and Quality
   f. Downlink Receive Level and Quality
   g. Timing Advance (TA)
   h. Network Measurement Reports
   i. ARFCN
   j. Timeslot
   k. Channel type
   l. Subchannel number
   m. Frequency list
   n. MAIO
   o. HSN
   p. Frame number
   q. Encryption keys
   r. Encryption algorithm
   s. Error correction coding method and level
   t. Assigned frames
   u. Modulation scheme (GMSK, 8PSK, QPSK, QAM . . . )
   v. CDMA spreading code
   w. Pilot PN offset
   x. Reverse pilot channel format
   y. Beta parameters (power ratio pilot channel vs. data channel in UMTS)
   z. Long code mask
   aa. Spreading factor FIGS. 7 and 8 illustrate exemplary architectures for a GERAN/UTRAN network reference in which an LES 220 is deployed as a Location Services client (LCS). In addition, FIG. 7 shows a GSM LDP Device 100A and a UMTS LDP Device 110B. FIG. 7 illustrates an exemplary architecture in which an LES 220 is deployed as a Location Services client (LCS) allowing the LES 220 to both interact with the GMLC 98 and communicate to the LDP 110A and 110B via a TCP/IP connection 1776 to the GGSN 46. FIG. 8 illustrates an exemplary architecture in which an LES 220 is deployed as an LCS allowing the LES 220 to both interact with the GMLC 98 and a user plane A-GPS server 666 over TCP/IP connection 1234. The remaining elements are summarized below. The system may be viewed as a substantial extension of the system described in U.S. Pat. No. 6,782,264 (Anderson).

It should be noted that many of the acronyms and abbreviations used herein are taken from Technical Report GSM 01.04 V8.0.0 (2000-05), Digital cellular telecommunications system (Phase 2+); version 8.0.0 (Release 1999); Abbreviations and acronyms. The terminology and nomenclature are intended to be non-limiting and are based on the GSM definitions published by the GSM Association in "Terms & Acronyms". However, although GSM-centric terms are used, the concepts embodied in the described herein apply to other wireless radio communications networks. In Universal Mobile Telecommunications System (UMTS), the planned successor to GSM, the wideband Code Division Multiple Access (W-CDMA) radio interface will benefit from use of wideband RNM receivers for passive radio monitoring. Wideband LMUs may be used for high-accuracy U-TDOA and AoA location. Changes to the interface and interoperability standards by the Third Generation Partnership Program (3GPP) mean that some of the acronyms and naming conventions change, but the operations performed in the radio control network and intelligent services network remain substantively the same. Thus, in this specification, these items can be viewed as equivalents:

| GSM/GPRS/GSM-R | UMTS |
|---|---|
| Cell Global Identifier (CGI) | Cell ID (CI) |
| Timing Advance (TA) | ½ Round-Trip-Time (RTT) |
| Abis Interface | Iub Interface |
| A Interface | Iu-CS (circuit Switched) or Iu-PS (Packet Switched) |
| Abis Monitor (LMS) | Iub Monitor (IMS) |
| Base transceiver station (BTS) | Node-B |
| Base station Controller (BSC) | Radio Network Controller (RNC) |
| Mobile Station (MS) | User Equipment (UE) |
| Subscriber Information Module (SIM) | User Service Identity Module (USIM) |

FIG. 7 shows the architecture of an illustrative GERAN/UTRAN network reference model 10 with a Radio Network Monitor (RNM) 82 and a Link Monitoring System (LMS) 11. The RNM 82 is effectively a bank of narrowband receivers tunable to both the uplink and downlink channels anywhere in the frequency band. The LMS is able to monitor not only the Abis and A interfaces but also the GSM-MAP, Iub, Iu-PS and Iu-CS interfaces. The LMS can be implemented, with modifications, on the same hardware/software chassis as the Abis Monitor (a set of custom applications with unmodified Agilent Access7 software application running on a cluster of Intel TSEMT2 or TSRLT2 UNIX servers).

The network 10 further includes a Serving Mobile Location Center (SMLC) 12. The RNM 82 is the primary component that can be deployed at a carrier's cell sites. The RNM 82 is preferably implemented as a distributed network of radio receivers capable of receiving RACH and SDCCH messages for autonomous generation of location services. The RNM 82 tunes to directed frequencies to gather data for the system. The RNM 82 can then forward the collected data to the SMLC 12. All RNMs 82 in a network are preferably time- and frequency-synchronized through the use of the Global Positioning Satellite (GPS) constellation (not shown).

The SMLC 12 is preferably a high volume location-processing platform. The SMLC 12 contains U-TDOA and multipath mitigation algorithms for computing location, confidence interval, speed, and direction of travel. The SMLC 12 can also determine which wireless phones to locate based upon triggering from the Link Monitoring System (LMS) 11 or requests from the Lb interface 54 to an infrastructure vendor's Base Station Controller (BSC) 96 (or MSC 50 in some cases). The SMLC 12 is typically co-located at the operator's BSC 96 but can also be remotely distributed. The primary functions of the SMLC 12 are to receive reports on signal detection from the RNMs 82, to perform location processing, and to calculate the location estimate for each signal. The SMLC 12 manages the network and provides carrier access to location records. The SMLC 12 is responsible for the collection and distribution of location records. The SMLC 12 also maintains configuration information and supports network management.

The LMS 11 continuously monitors all Abis signaling links 76 (and in some cases A-interface links 52 and GSM Mobile Application Protocol (GSM-MAP) 48 interface) in a network 10 to which the LMS 11 is connected. The function of the LMS 11 is to capture messages in the call (e.g., a GSM voice conversation or a GPRS data session) and SMS setup procedure, mid-call control messages, and call termination and release messages for MSs 80. The LMS 11 then forwards the data contained in those messages to the SMLC 12 for subsequent location processing.

The GSM service control function (gsmSCF) 20, also called a service control point (SCP), contains database and logical rules for providing non-call oriented services to a subscriber. The GSM Mobile Application Protocol (GSM-MAP) 48 is the communications medium for call-related control services on the wired part of a wireless network. The GSM-MAP 48 exists to provide services like automatic roaming, authentication, location services intersystem hand-off, and short message service routing on a GSM or UMTS network. All wireless network elements such as the MSC 50, HLR 34, VLR (in the MSC 50), GMSC 44, EIR 32, GMLC 98, and gsmSCF 20 use this messaging protocol to communicate among each other. The GSM-MAP 48 resides on the international Signaling System 7 network (SS7).

The Gateway Mobile Location Center (GMLC) 98 is defined by 3GPP standards as the clearinghouse for location records in a GSM/GPRS/UMTS network. The GMLC 98 serves as a buffer between the tightly controlled SS7 network (the GSM-MAP network) 48 and the public internet. Authentication, access control, accounting, and authorization functions for location-based services are commonly resident on or controlled by the GMLC 98.

The Le interface 24 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 22 is also known as a LCS (Location Services). The LBS and LCS 22 are software applications and services uniquely enabled to use the location of a mobile device.

The E5+ interface 18 is a modification of the E5 interface defined in the Joint ANSI/ETSI Standard 036 for North American E9-1-1. The E5+ interface 18 connects the SMLC 12 and GMLC 98 nodes directly allowing for push operations when LMS 11 or RNM 82 triggers are used by the wireless location system with either network acquired information (cell-ID, NMR, TA, etc) or via TDOA and/or AoA (angle of arrival) performed by specialized receivers.

User equipment (UE) 88 can be defined as equipment such as a UMTS mobile device. NodeB 86 is the Universal Mobile Telephony System Radio Access Network (UTRAN) network interface to the UMTS radio interface. The Radio Network Controller (RNC) 70 enables autonomous radio resource management (RRM) by UTRAN. The RNC 70 performs the same functions as the GSM BSC, providing central control for the RNS elements (RNC and Node Bs). The RNC 70 handles protocol exchanges between Iu, Iur, and Iub interfaces and is responsible for centralized operation and maintenance of the entire radio network system.

The Serving GPRS Support Node (SGSN) 68 monitors the location of individual GPRS capable Mobile Stations 80 and performs basic security functions and access control functions. The SGSN 68 can serve both the Global System for Mobility (GSM) radio access network (GERAN) and UMTS radio networks.

The Gateway GPRS Support Node (GGSN) 46 acts as a system routing gateway for the GPRS network. The GGSN 46 is a connection to external packet data networks (e.g., public internet) and performs the task of billing, routing, security firewalling, and access filtering. The Gateway MSC (GMSC) 44 acts as a bridge for roaming subscribers to visited MSCs in other operator's networks. Both control signaling and traffic trunks are setup via the GMSC 44.

The Um 15 is the GSM radio interface. The Uu 17 is the UMTS radio interface. The Iub interface 90 is located on a UMTS network and is found between the RNC (Radio Network Controller) 70 and the NodeB 86. The Iupc 72 interconnects the UMTS RNC 70 with the SMLC (also called the SAS) in the UMTS network for location estimation generation. The Iu-CS (Circuit Switched) interface 62 connects the UMTS RNC 70 with the circuit switched communications oriented network (the MSC) 50. The Iu-PS (Packet Switched) interface 74 connects the UMTS RNC 70 with the packet switched communications oriented network (SGSN) 68. The Gb interface 66 interconnects the BSC 96 with the SGSN 68 allowing for routing of GPRS communications.

The Gn interface 60 is a GPRS packet interface which is located between the SGSN 68 and GGSN 46. The Gs interface 64 is a GPRS system interface located between the SGSN 68 and the MSC 50. The Gr interface is a GSM-MAP interface which is located between the SGSN 68 and the Home Location Register (HLR) 34.

As described in U.S. Pat. No. 6,782,264, it is possible to monitor the base transceiver station (BTS) to base station controller (BSC) link (e.g., the Abis link) for triggering messages and information fields. A passive network monitor, called the AMS (Abis Monitoring System) in the '264 patent and exemplified by monitoring the GSM Abis interface, has been extended in accordance with the present invention and is now called the Link Monitoring System, or LMS. The Link Monitoring System (LMS) can monitor multiple cellular network data links simultaneously, scanning for data of interest, and can detect particular messages or data fields within messages. Setting or tasking of messages or data fields of interest can take place at any time. When a match occurs, the LMS may be further triggered to perform a pre-set action, such as a write to storage memory or forwarding of the triggering message and (or) data fields to another system node.

The Radio Network Monitor extends the concept of passive monitoring for location triggering information and messaging to the radio air interface. The RNM can detect and monitor both uplink (mobile device to BTS or NodeB) and downlink radio communications.

The illustrative system employs information from both the wireless network and the wired (or landline) network. In advance of national or international standardization efforts for location-based services in such organizations as 3GPP, ETSI and ANSI, the LMS has been developed to assist in acquiring the certain radio, call and caller information for the immediate deployment of location-based services. All attributes and abilities of the LMS can be incorporated into other nodes of the wireless and wired communications networks. This approach is applicable to all digital cellular and like wireless networks, including but not limited to TDMA, CDMA, and OFDM-based wireless networks. (OFDM stands for Orthogonal Frequency Division Modulation, a spread spectrum method used for carrier modulation in digital transmissions). The GSM system is used to describe certain aspects of the present invention, but the differing naming systems and acronym conventions used does not preclude application of the invention to the GPRS and UMTS system.

The Link Monitoring System allows for passive, non-intrusive monitoring of, for example, the GSM, GSM-R, GPRS, and UTMS systems. In the exemplary case of a GSM system, the LMS can passively receive data streams from the Abis (BTS-BSC) interface, the A (BSC-MSC) interface, and the GSM MAP interface (MSC-HLR, MSC-GMLC, MSC-GMSC and MSC-gsmSCF). The term GSM MAP (where MAP stands for Mobile Application Part) is used to refer to the global SS7 network and includes the C, D, E, F, H, Gc, Gf, Gr, Lh, and Lg interfaces.

In the exemplary case of a GPRS system, the LMS can passively receive data streams from the Abis (BTS-BSC or BTS-PCU) interface, the Gb (PCU-SGSN) interface, and the GSM MAP interface (SGSN-HLR, SGSN-GMLC and SGSN-gsmSCF). In the exemplary case of a UMTS system, the LMS can passively receive data streams from the Iub (Node B-RNC) interface, the Iu-CS (RNC-MSC) interface, the Iu-PS (RNC-SGSN) interface, and the GSM MAP interface (MSC-HLR, MSC-GMLC and MSC-gsmSCF, SGSN-HLR, SGSN-GMLC and SGSN-gsmSCF).

The LMS can search received data for particular messages or data fields within messages. Setting or tasking of messages or data fields of interest can take place at any time. When a match occurs, the LMS is further triggered to perform a pre-set action, normally a write to storage memory or forwarding of the triggering message and (or) data fields to another system node.

Once the LMS has been triggered, a variety of information may be obtained from the triggering message or subsequent data messaging. Information gleaned from this method can include event-related information, mobile or subscriber account information, conversation-related information, serving cell information, and radio environment information.

Event-related information can include the triggering event, accumulated radio interface and cellular system data, subscriber data, the monitored data link where the triggering data was received as well as internally developed LMS timestamp and indexing information. Mobile or subscriber account information can include information available from the handset over the radio interface and from the carrier HLR. Both the IMEI from the handset and the IMSI from the SIM could be acquired, as well as the calling or called MS-ISDN, dependent on the links monitored and the messages scanned. Conversation-related information can include the calling number and the called number for both the mobile originating and mobile terminating cases. These numbers are sometimes also called the SMS PINS, but would still be included in the conversation-related information.

Serving cell information can include the Cell ID (CGI for GERAN networks or CI for UMTS networks), the Timing Advance (TA in GSM/GPRS) or Round-Trip-Time (RTT in UMTS), the Radio Frequency (Absolute Radio Frequency Channel Number (ARFCN)), the Base Station Identity Code (BSIC), the Terminal Endpoint Identifier (TEI), and Location Area Code (LAC). Prior Cell information is available during a handover event and includes the same data set as the current serving cell.

Radio-related information gathered by the system can include the uplink (MS to BTS, or UE to Node-B) and the downlink (BTS to MS or Node-B to UE) power and quality levels, and the Beacon or Broadcast Control Channel (BCCH) ARFCN, power, and quality. The relevant radio parameters listed above may also be used. (For example, these may include: Serving Cell—CGI; Serving Cell—ARFCN; Serving Cell—BSIC; Prior Cell—CGI and TA (for handover event); Uplink Receive Level and Quality; Downlink Receive Level and Quality; Timing Advance (TA); Network Measurement Reports; ARFCN; Timeslot; Channel type; Subchannel number; Frequency list; MAIO; HSN; Frame number; Encryption keys; Encryption algorithm; Error correction coding method and level; Assigned frames; Modulation scheme (GMSK, 8PSK, QPSK, QAM, . . . ); CDMA spreading code; Pilot PN offset; Reverse pilot channel format; Beta parameters (power ratio pilot channel vs. data channel in UMTS); Long code mask; Spreading factor.) The Network Measurement Report (NMR) with channel and power levels to potential handoff candidates sectors or cells can also be collected when available.

LDP Location with Only a Network-Based Wireless Location System

An LDP Device 110 not equipped with a device-based location determination engine can report its position in a non-network-based WLS environment to a LES 220 equipped with an SMSC. At the highest level, the LDP Device 110 can report the System ID (SID or PLMN) number or Private System ID (PSID) so the WLS can make the determination that the LDP is in (or out) of a WLS equipped system. The neighbor (MAHO) list transmitted as a series of SMS messages on the control channel could give rough location in a friendly carrier network that has not yet been equipped with a VvLS. Reverse SMS allows for the WLS to reprogram any aspect of the LDP. If the LDP Device 110 is in a network-based WLS equipped area, the LDP Device 110 can then offer higher levels of accuracy using the network-based WLS.

Automatic Transmitter Location via LDP with Network Database

If the LDP Device 110 radio communications subsystem is designed for multi-frequency, multi-mode operation or if the LDP Device 110 is provided with connection to external receivers or sensors, the LDP Device 110 becomes a location-enabled telemetry device. In a particular application, the LDP Device 110 uses the radio communications subsystem or external receiver to locate radio broadcasts. Reception of such broadcasts, identified by the transmission band or information available from the broadcast, triggers the LDP Device 110 to establish a data connection to the LES 220, perform a device-based location or begin a location-enhanced transmission for use by the LES 220 or other network-based server.

One exemplary use of this LDP Device 110 variant is as a networked radar detector for automobiles or as a WiFi hotspot locator. In either case, the LES 220 would record the network information and location for delivery to external location-enabled applications.

Use of Externally Derived Precision Timing for Scheduling Communications

Battery life may be a key enabler for at least some applications of autonomous location specific devices. In addition, the effort associated with periodically charging or replacing batteries in a location specific device is anticipated to be a significant cost driver. A device is considered to have 3 states: active, idle, sleep.

Active=in communication with the network
Idle=in a state capable of entering the active state
Sleep=a low power state The power consumption in the active state is driven by the efficiency of digital and RF electronics. Both of these technologies are considered mature and their power consumption is considered to be already optimized. The power consumption in the sleep mode is driven by the amount of circuitry active during the sleep state. Less circuitry means less power consumption. One method of minimizing power consumption is to minimize the amount of time spent in the idle state. During the idle state, the device must periodically listen to the network for commands (paging) and if received enter the active state. In a standard mobile station (MS), the amount of time spent in the idle state is minimized by restricting the when the paging commands can occur for any particular mobile station.

This aspect of the invention utilizes an absolute external time reference (GPS, A-GPS, or information broadcast over a cellular network) to precisely calibrate the location specific device's internal time reference. An internal temperature sensing device would enable the device to temperature compensate its own reference. The GPS or A-GPS receiver can be part of the location determination engine of the LDP Device 110 used for device-based location estimation.

Given that the location specific device has a precise time reference, the network can schedule the device to enter the idle mode at a precise time thereby maximizing the amount of time spent in the lowest power state. This method will also minimize unsuccessful attempts to communicate with a device in sleep mode thereby minimizing load on the communication network.

Speed, Time, Altitude, Area Service

The LDP Device functionality may be incorporated into other electronic devices. As such, the LDP, a location-aware device with radio communications to an external server with a database of service parameters and rules for use, can be used to grant, limit or deny service on the basis of not only location within a service area, but also on the basis of time, velocity, or altitude for a variety of electronic devices such as cell phones, PDAs, radar detectors, or other interactive systems. Time includes both time-of-day and also periods of time so duration of a service can be limited.

Intelligent Mobile Proximity

The LDP Device 110 may be paired with another LDP Device to provide intelligent proximity services where the granting, limiting, or denial of services can be based on the proximity of the LDP pair. For instance, in an anti-theft application, an LDP Device 110 could be incorporated into an automobile while other LDPs would be incorporated into the car radio, navigation system, etc. By registering the set of LDP Devices as paired in the LES 220, and setting triggering conditions for location determination based on activation or removal, an anti-theft system is created. In the case of unauthorized removal, the LDP Device 110 in the removed device could either deny service or allow service while providing location of the stolen device incorporating the LDP Device.

F. Location Techniques: Network-Based, Device-Based and Hybrid

Each wireless (radio) location system comprises a transmitter and receiver. The transmitter creates the signal of interest [s(t), which is collected and measured by the receiver. The measurement of the signal of interest may take place at either the wireless device or the network station. The transmitter or the receiver can be in motion during the signal measurement interval. Both may be in motion if the movements of either (or both) can be precisely defined a priori.

Network-Based Location Techniques

When the measurement takes place at the network (a geographically distributed set of one or more receivers or transceivers), the location system is known as network-based. Network-based wireless location systems can use TOA, TDOA, AOA, POA, and PDOA measurements, often hybridized with two or more independent measurements being included in the final location calculation. The networked receivers or transceivers are known by different names, including Base Stations (cellular), Access Points (Wireless Local Access Networks), Readers (RFID), Masters (Bluetooth) or Sensors (UWB).

Since, in a network-based system, the signal being measured originates at the mobile device, network-based systems receive and measure the signal's time of arrival, angle of arrival, or signal strength. Sources of location error in a network-based location system include: network station topology, signal path loss, signal multipath, co-channel signal interference and terrain topography.

Network station topology can be unsuitable for a network-based location technique with sites in a line (along a roadway) or sites with few neighbors.

Signal path loss can be compensated for by longer sampling periods or using a higher transmit power. Some radio environments (wide area, multiple access spread spectrum systems such as IS-95 CDMA and 3GPP UMTS) have a hear-ability issue due to the lower transmit powers allowed.

Multipath signals, caused by constructive and destructive interference of reflected, non-line-of-sight signal paths will also affect location accuracy and yield of a network-based system, with dense urban environments being especially problematic. Multipath may be compensated for by use of multiple, separated receive antennas for signal collection and post-collection processing of the multiple received signals to remove time and frequency errors from the collected signals before location calculation.

Co-channel signal interference in a multiple access radio environment can be minimized by monitoring of device specific features (example: color-code) or by digital common mode filtering and correlation between pairs of collected signals to remove spurious signal components.

Network-Based—TOA

A Network-based Time-of-Arrival system relies on a signal of interest being broadcast from the device and received by the network station. Variants of Network-based TOA include those summarized below.

Single Station TOA

A range measurement can be estimated from the round-trip time of a polling signal passed between and then returned between transceivers. In effect this range measurement is based on the TOA of the returned signal. Combining the range estimate with the known location of the network node provides a location estimate and error estimate. Single station TOA is useful in hybrid systems where additional location information such as angle-of-arrival or power-of-arrival is available.

An example of the commercial application of the single station TOA technique is found in the CGI+TA location method described in ETSI Technical Standards for GSM: 03.71, and in Location Services (LCS); Functional description; Stage 2_23.171 by the 3rd Generation Partnership Project (3GPP).

Synchronous Network TOA

Network-based TOA location in a synchronous network uses the absolute time of arrival of a radio broadcast at multiple receiver sites. Since signals travel with a known velocity, the distance can be calculated from the times of arrival at the receivers. Time-of-arrival data collected at two receivers will narrow a position to two points, and TOA data from a receiver is required to resolve the precise position. Synchronization of the network base stations is important. Inaccuracy in the timing synchronization translates directly to location estimation error. Other static sources of error that may be calibrated out include antenna and cabling latencies at the network receiver.

A possible future implementation of Synchronous Network TOA, when super-high accuracy (atomic) clocks or GPS-type radio time references achieve affordability and portability, is for the transmitter and receivers to be locked to a common time standard. When both transmitters and receivers have timing in common, the time-of-flight can be calculated directly and the range determined from the time-of-flight and speed of light.

Asynchronous Network TOA

Network-based TOA location in an asynchronous network uses the relative time of arrival of a radio broadcast at the network-based receivers. This technique requires that the distance between individual receiver sites and any differences in individual receiver timing be known. The signal time-of-arrival can then be normalized at for receiver site, leaving only the a time-of-flight between the device and each receiver. Since radio signals travel with a known velocity, the distance can be calculated from derived, normalized time-of-arrivals at the receivers. Time-of-arrival data collected from three of more receivers will be used to resolve the precise position.

Network-Based TDOA

In a network-based (uplink) time-difference-of-arrival wireless location system, the transmitted signal of interest is collected, processed, and time-stamped with great precision at multiple network receiver/transceiver stations. The location of each network station, and thus the distance between stations, is known precisely. The network receiver stations time stamping requires either highly synchronized with highly stable clocks or that the difference in timing between receiver station is known.

A measured time difference between the collected signals from any pair of receiver stations can be represented by a hyperbolic line of position. The position of the receiver can be determined as being somewhere on the hyperbolic curve where the time difference between the received signals is constant. By iterating the determination of the hyperbolic line of position between every pair of receiver stations and calculating the point of intersection between the hyperbolic curves, a location estimation can be determined.

Network-Based AoA

The AOA method uses multiple antennas or multi-element antennae at two or more receiver sites to determine the location of a transmitter by determining the incident angle of an arriving radio signal at each receiver site. Originally described as providing location in an outdoor cellular environment, see U.S. Pat. No. 4,728,959, "Direction Finding Localization," the AoA technique can also be used in an indoor environment using Ultrawideband (UWB) or WiFi (IEEE802.11) radio technologies.

Network-Based POA

Power of arrival is a proximity measurement used between a single network node and wireless device. If the system consists of transceivers, with both a forward and reverse radio channel available between the device and network node, the wireless device may be commanded to use a certain power for transmission, otherwise the power of the device transmitter should be known a priori. Since the power of a radio signal decreases with range (from attenuation of radio waves by the atmosphere and the combined effects of free space loss, plane earth loss, and diffraction losses), an estimate of the range can be determined from the received signal. In simplest terms, as the distance between transmitter and receiver increases, the radiated radio energy is modeled as if spread over the surface of a sphere. This spherical model means that the radio power at the receiver is decreased by the square of the distance. This simple POA model can be refined by use of more sophisticated propagation models and use of calibration via test transmissions at likely transmission sites.

Network-Based POA Multipath

This power-of-arrival location technology uses features of the physical environment to locate wireless devices. A radio transmission is reflected and absorbed by objects not on the direct line-of-sight on the way to the receiver (either a network antenna or device antenna), causing multipath interference. At the receiver, the sum of the multiple, time delayed, attenuated copies of the transmission arrive for collection.

The POA multipath fingerprinting technique uses the amplitude of the multipath degraded signal to characterize the received signals for comparison against a database of amplitude patterns known to be received from certain calibration locations.

To employ multipath fingerprinting, an operator calibrates the radio network (using test transmissions performed in a grid pattern over the service area) to build the database of amplitude pattern fingerprints for later comparison. Periodic re-calibration is required to update the database to compensate for changes in the radio environment caused by seasonal changes and the effects of construction or clearances in the calibrated area.

Network-Based PDOA

Power-difference-of-arrival requires a one-to-many arrangement with either multiple sensors and a single transmitter or multiple transmitters and a single sensor. PDOA techniques require that the transmitter power and sensor locations be known a priori so that power measurements at the measurement sensors may be calibrated for local (to the antenna and sensor) amplification or attenuation.

Network-Based Hybrids

Network-based systems can be deployed as hybrid systems using a mix of solely network-based or one of network-based and device-based location technologies.

Device-Based Location Techniques

The device-based receivers or transceivers are known by different names: Mobile Stations (cellular), Access Points (Wireless Local Access Networks), transponders (RFID), Slaves (Bluetooth), or Tags (UWB). Since, in a device-based system. the signal being measured originates at the network, device-based systems receive and measure the signal's time of arrival or signal strength. Calculation of the device location may be performed at the device or measured signal characteristics may be transmitted to a server for additional processing.

Device-Based TOA

Device-based TOA location in a synchronous network uses the absolute time of arrival of multiple radio broadcasts at the mobile receiver. Since signals travel with a known velocity, the distance can be calculated from the times of arrival either at the receiver or communicated back to the network and calculated at the server. Time of arrival data from two transmitters will narrow a position to two points, and data from a third transmitter is required to resolve the precise position. Synchronization of the network base stations is important. Inaccuracy in the timing synchronization translates directly to location estimation error. Other static sources of error that may be calibrated out include antenna and cabling latencies at the network transmitter.

A possible future implementation of device-based Synchronous Network TOA, when super-high accuracy (atomic) clocks or GPS-type radio time references achieve affordability and portability, is for the network transmitter and receivers to both be locked to a common time standard. When both transmitters and receivers have timing in common, the time-of-flight can be calculated directly and the range determined from the time-of-flight and speed of light.

Device-Based TDOA

Device-based TDOA is based at collected signals at the mobile device from geographically distributed network transmitters. Unless the transmitters also provide (directly or via broadcast) their locations or the transmitter locations are maintained in the device memory, the device cannot perform the TDOA location estimation directly, but must upload the collected signal related information to a landside server.

The network transmitters stations signal broadcasting requires either transmitter synchronization with highly stable clocks or that the difference in timing between transmitter stations is known to the location determination engine located either on the wireless device or the landside server.

Commercial location systems using device-based TDOA include the Advanced Forward Link Trilateration (AFLT) and Enhanced Forward Link Trilateration (EFLT) (both standardized in ANSI standard IS-801) systems used as a medium accuracy fallback location method in CDMA (ANSI standard IS-95, IS-2000) networks.

Device-Based Observed Time Difference

The device-based Observed Time Difference location technique measuring the time at which signals from the three or more network transmitters arrive at two geographically dispersed locations. These locations can be a population of wireless handsets or a fixed location within the network. The location of the network transmitters must be known a priori to the server performing the location calculation. The position of the handset is determined by comparing the time differences between the two sets of timing measurements.

Examples of this technique include the GSM Enhanced Observed Time Difference (E-OTD) system (ETSI GSM standard 03.71) and the UMTS Observed Time Difference of Arrival (OTDOA) system. Both EOTD and OTDOA can be combined with network TOA or POA measurements for generation of a more accurate location estimate.

Device-Based TDOA—GPS

The Global Positioning System (GPS) is a satellite-based TDOA system that enables receivers on the Earth to calculate accurate location information. The system uses a total of 24 active satellites with highly accurate atomic clocks placed in six different but equally spaced orbital planes. Each orbital plane has four satellites spaced equidistantly to maximize visibility from the surface of the earth. A typical GPS receiver user will have between five and eight satellites in view at any time. With four satellites visible, sufficient timing information is available to be able to calculate the position on Earth.

Each GPS satellite transmits data that includes information about its location and the current time. All GPS satellites synchronize operations so that these repeating signals are transmitted at effectively the same instant. The signals, moving at the speed of light, arrive at a GPS receiver at slightly different times because some satellites are further away than others. The distance to the GPS satellites can be determined by calculating the time it takes for the signals from the satellites to reach the receiver. When the receiver is able to calculate the distance from at least four GPS satellites, it is possible to determine the position of the GPS receiver in three dimensions.

The satellite transmits a variety of information. Some of the chief elements are known as ephemeris and almanac data. The ephemeris data is information that enables the precise orbit of the satellite to be calculated. The almanac data gives the approximate position of all the satellites in the constellation and from this the GPS receiver is able to discover which satellites are in view.

$$x(t) = \sum_i a_i D_i(t) CA_i(t, t_i^0) \sin(2\pi f_i + \phi_i)$$

where:
i: satellite number
ai: carrier amplitude
Di: Satellite navigation data bits (data rate 50 Hz)
CAi: C/A code (chipping rate 1.023 MHz)
t: time
ti0: C/A code initial phase
fi: carrier frequency
φi: carrier phase
n: noise
w: interference Device-Based Hybrid TDOA—A-GPS Due to the long satellite acquisition time and poor location yield when a direct line-of-sight with the GPS satellites cannot be obtained, Assisted-GPS was disclosed by Taylor (see U.S. Pat. No. 4,445,118, "Navigation system and method").

Wireless Technologies for Location

Broadcast Location Systems

Location systems using dedicated spectrum and comprising geographically dispersed receiver networks and a wireless transmitter 'tag' can be used with the present invention as can systems supplying timing signals via geographically dispersed networks of transmitting beacons with the LDP Device 110 acting as a receiver or transceiver unit. The LDP Device 110 is well suited to be either the transmitter tag or receiver unit for such a wireless system and may use such networks dependent on service area, accessibility and pricing of the location service. In the case of a location network operating in a dedicated spectral band, the LDP Device 110 could use its ability to utilize other radio communications networks to converse with the LES 220 and landside location applications. Examples of these broadcast location system include the Lo-jack vehicle recovery system, the LORAN system, and the Rosum HDTV transmitter-based, E-OTD-like system.

Cellular

Wireless (Cellular) systems based on AMPS, TDMA, CDMA, GSM, GPRS, and UMTS all support the data communications link required for the present invention. Cellular location systems and devices for enhancing cellular location techniques have been taught in detail in TruePosition's United States patents. These patents cover various location approaches, including but not limited to AoA, AoA hybrids, TDOA, TDOA hybrids including TDOA/FDOA, A-GPS, hybrid A-GPS. Many of the described technologies are now in commercial service.

Local and Wide Area Networks

These wireless systems were all designed as purely digital data communications systems rather than voice-centric systems with data capabilities added on as a secondary purpose. Considerable overlap in radio technologies, signal processing techniques, and data stream formats has resulted from the cross pollination of the various standards groups involved. The European Telecommunications Standards Institute (ETSI) Project for Broadband Radio Access Networks (BRAN), the Institute of Electrical and Electronics Engineers (IEEE), and the Multimedia Mobile Access Communication Systems (MMAC) in Japan (Working Group High Speed Wireless Access Networks) have all acted to harmonize the various systems developed.

In general, WLAN systems that use unlicensed spectrum operate without the ability to handoff to other access points. Lack of coordination between access points will limit location techniques to single-station techniques such as POA and TOA (round-trip-delay).

IEEE 802.11—WiFi

WiFi is standardized as IEEE 802.11. Variants currently include 802.11a, 802.11b, 802.11g, and 802.11n. Designed as a short range, wireless local-are-network using unlicensed spectrum, WiFi system are well suited for the various proximity location techniques. Power is limited to comply with FCC Part 15 (Title 47 of the Code of Federal Regulations transmission rules, Part 15, subsection 245).

Part 15.245 of the FCC rules describes the maximum effective isotropic radiated power (EIRP) that a license-free system can emit and be certified. This rule is meant for those who intend to submit a system for certification under this part. It states that a certified system can have a maximum of 1 watt (+36 dBm) of transmit power into an omni-directional antenna that has 6 dBi gain. This results in an EIRP of: +30 dBm+6 dBi=+36 dBm (4 watts). If a higher gain omni-directional antenna is being certified, then the transmit power into that antenna must reduced so that the EIRP of that system does not exceed +36 dBm EIRP. Thus, for a 12 dBi omni antenna, the maximum certifiable power is +24 dBm (250 mW (+24 dBm+12 dBi=36 dBm). For directional antennas used on point-to-point systems, the EIRP can increase by 1 dB for every 3 dB increase in gain of the antenna. For a 24 dBi dish antenna, it works out that +24 dBm of transmit power can be fed into this high gain antenna. This results in an EIRP of: +24 dBm+24 dBi=48 dBm (64 Watts).

IEEE 802.11 proximity location methods can be either network-based or device-based.

HiperLAN

HiperLAN is short for High Performance Radio Local Area Networks. Developed by the European Telecommunications Standards Institute (ETSI), HiperLAN is a set of WLAN communication standards used chiefly in European countries.

HiperLAN is a comparatively short-range variant of a broadband radio access network and was designed to be a complementary access mechanism for public UMTS (3GPP cellular) networks and for private use as a wireless LAN type systems. HiperLAN offers high speed (up to 54 Mb/s) wireless access to a variety of digital packet networks.

IEEE 802.16—WiMAN, WiMAX

IEEE 802.16 is working group number 16 of IEEE 802, specializing in point-to-multipoint broadband wireless access.

IEEE 802.15.4—ZigBee

IEEE 802.15.4/ZigBee is intended as a specification for low-powered networks for such uses as wireless monitoring and control of lights, security alarms, motion sensors, thermostats and smoke detectors. 802.15.4/ZigBee is built on the IEEE 802.15.4 standard that specifies the MAC and PHY layers. The "ZigBee" comes from higher-layer enhancements in development by a multi-vendor consortium called the Zigbee Alliance. For example, 802.15.4 specifies 128-bit AES encryption, while ZigBee specifies but how to handle encryption key exchange. 802.15.4/ZigBee networks are slated to run in the unlicensed frequencies, including the 2.4-GHz band in the U.S.

Ultra Wideband (UWB)

Part 15.503 of FCC rules provides definitions and limitations for UWB operation. Ultrawideband is a modern embodiment of the oldest technique for modulating a radio signal (the Marconi Spark-Gap Transmitter). Pulse code modulation is used to encode data on a wide-band spread spectrum signal.

Ultra Wideband systems transmit signals across a much wider frequency than conventional radio communications systems and are usually very difficult to detect. The amount of spectrum occupied by a UWB signal, i.e., the bandwidth of the UWB signal, is at least 25% of the center frequency. Thus, a UWB signal centered at 2 GHz would have a minimum bandwidth of 500 MHz and the minimum bandwidth of a UWB signal centered at 4 GHz would be 1 GHz. The most common technique for generating a UWB signal is to transmit pulses with durations less than 1 nanosecond.

Using a very wideband signal to transmit binary information, the UWB technique is useful for a location either be proximity (via POA), AoA, TDOA or hybrids of these techniques. Theoretically, the accuracy of the TDOA estimation is limited by several practical factors such as integration time, signal-to-noise ratio (SNR) at each receive site, as well as the bandwidth of the transmitted signal. The Cramer-Rao bound illustrates this dependence. It can be approximated as:

$$TDOA_{rms} = \frac{1}{2\pi f_{rms}\sqrt{2SbT}}$$

where $f_{rms}$ is the rms bandwidth of the signal, b is the noise equivalent bandwidth of the receiver, T is the integration time and S is the smaller SNR of the two sites. The TDOA equation represents a lower bound. In practice, the system should deal with interference and multipath, both of which tend to limit the effective SNR. UWB radio technology is highly immune to the effects of multipath interference since the signal bandwidth of a UWB signal is similar to the coherence bandwidth of the multipath channel allowing the different multipath components to be resolved by the receiver.

A possible proxy for power of arrival in UWB is use of the signal bit rate. Since signal-to-noise ratios (SNRs) fall with increasing power, after a certain point faster than the power rating increases, a falling s/n ratio means, in effect, greater informational entropy and a move away from the Shannon capacity, and hence less throughput. Since the power of the UWB signal decreases with range (from attenuation of radio waves by the atmosphere and the combined effects of free space loss, plane earth loss, and diffraction losses), the maximum possible bit rate will fall with increasing range. While of limited usage for a range estimate, the bit rate (or bit error rate) could serve as an indication of the approach or departure of the wireless device.

In simplest terms, as the distance between transmitter and receiver increases, the radiated radio energy is modeled as if spread over the surface of a sphere. This spherical model means that the radio power at the receiver is decreased by the square of the distance. This simple model can be refined by use of more sophisticated propagation models and use of calibration via test transmissions at likely transmission sites.

Bluetooth

Bluetooth was originally conceived as a Wireless Personal Area Network (W-PAN or just PAN). The term PAN is used interchangeably with the official term "Bluetooth Piconet". Bluetooth was designed for very low transmission power and has a usable range of under 10 meters without specialized, directional antenna. High-powered Bluetooth devices or use of specialized directional antenna can enable ranges up to 100 meters. Considering the design philosophies (the PAN and/or cable replacement) behind Bluetooth, even the 10 m range is adequate for the original purposes behind Bluetooth. A future version of the Bluetooth specification may allow longer ranges in competition with the IEEE802.11 WiFi WLAN networks.

Use of Bluetooth for location purposes is limited to proximity (when the location of the Bluetooth master station is known) although single station Angle-of-Arrival location or AoA hybrids are possible when directional antenna are used to increase range or capacity.

Speed and direction of travel estimation can be obtained when the slave device moves between piconets. Bluetooth piconets are designed to be dynamic and constantly changing so a device moving out of range of one master and into the range of another can establish a new link in a short period of time (typically between 1-5 seconds). As the slave device moves between at least two masters, a directional vector may be developed from the known positions of the masters. If links between three or more masters are created (in series), an estimate of the direction and speed of the device can be calculated.

A Bluetooth network can provide the data link necessary for the present invention. The LDP Device 110 to LES 220 data could also be established over a W-LAN or cellular data network.

RFID

Radio Frequency Identification (RFID) is an automatic identification and proximity location method, relying on storing and remotely retrieving data using devices called RFID tags or transponders. An RFID tag is an encapsulated radio transmitter or transceiver. RFID tags contain antennas to enable them to receive and respond to radio-frequency queries from an RFID Reader (a radio transceiver) and then respond with a radio-frequency response that includes the contents of the tags solid state memory.

Passive RFID tags require no internal power source and use power supplied by inductively coupling the reader with the coil antenna in the tag or by backscatter coupling between the reader and the dipole antenna of the tag. Active RFID tags require a power source.

RFID wireless location is based on the Power-of-Arrival method since the tag transmits a signal of interest only when in proximity with the RFID Reader. Since the tag is only active when scanned by a reader, the known location of the reader determines the location of the tagged item. RFID can be used to enable location-based services based on proximity (location and time of location). RFID yields no ancillary speed or direction of travel information.

The RFID reader, even if equipped with sufficient wired or wireless backhaul is unlikely to provide sufficient data link bandwidth necessary for the present invention. In a more likely implementation, the RFID reader would provide a location indication while the LDP-to-LES 220 data connection could also be established over a WLAN or cellular data network.

Near Field Communications

A variant of the passive RFID system, Near Field Communications (NFC) operates in the 13.56 MHz RFID frequency range. Proximity location is enabled, with the range of the NFC transmitter less than 8 inches. The NFC technology is standardized in ISO 18092, ISO 21481, ECMA (340, 352 and 356), and ETSI TS 102 190.

G. Citations to WLS-Related Patents

TruePosition, Inc., the assignee of the present invention, and its wholly owned subsidiary, KSI, Inc., have been investing in the field of wireless location for many years, and have procured a portfolio of related patents, some of which are cited above. Therefore, the following patents may be consulted for further information and background concerning inventions and improvements in the field of wireless location:

1. U.S. Pat. No. 6,876,859 B2, Apr. 5, 2005, Method for Estimating TDOA and FDOA in a Wireless Location System;
2. U.S. Pt. No. 6,873,290 B2, Mar. 29, 2005, Multiple Pass Location Processor;
3. U.S. Pat. No. 6,782,264 B2, Aug. 24, 2004, Monitoring of Call Information in a Wireless Location System;
4. U.S. Pat. No. 6,771,625 B1, Aug. 3, 2004, Pseudolite-Augmented GPS for Locating Wireless Phones;
5. U.S. Pat. No. 6,765,531 B2, Jul. 20, 2004, System and Method for Interference Cancellation in a Location Calculation, for Use in a Wireless Locations System;
6. U.S. Pat. No. 6,661,379 B2, Dec. 9, 2003, Antenna Selection Method for a Wireless Location System;
7. U.S. Pat. No. 6,646,604 B2, Nov. 11, 2003, Automatic Synchronous Tuning of Narrowband Receivers of a Wireless System for Voice/Traffic Channel Tracking;
8. U.S. Pat. No. 6,603,428 B2, Aug. 5, 2003, Multiple Pass Location Processing;
9. U.S. Pat. No. 6,563,460 B2, May 13, 2003, Collision Recovery in a Wireless Location System;
10. U.S. Pat. No. 6,546,256 B1, Apr. 8, 2003, Robust, Efficient, Location-Related Measurement;
11. U.S. Pat. No. 6,519,465 B2, Feb. 11, 2003, Modified Transmission Method for Improving Accuracy for E-911 Calls;
12. U.S. Pat. No. 6,492,944 B1, Dec. 10, 2002, Internal Calibration Method for a Receiver System of a Wireless Location System;
13. U.S. Pat. No. 6,483,460 B2, Nov. 19, 2002, Baseline Selection Method for Use in a Wireless Location System;
14. U.S. Pat. No. 6,463,290 B1, Oct. 8, 2002, Mobile-Assisted Network Based Techniques for Improving Accuracy of Wireless Location System;
15. U.S. Pat. No. 6,400,320, Jun. 4, 2002, Antenna Selection Method For A Wireless Location System;
16. U.S. Pat. No. 6,388,618, May 14, 2002, Signal Collection on System For A Wireless Location System;
17. U.S. Pat. No. 6,366,241, Apr. 2, 2002, Enhanced Determination Of Position-Dependent Signal Characteristics;
18. U.S. Pat. No. 6,351,235, Feb. 26, 2002, Method And System For Synchronizing Receiver Systems Of A Wireless Location System;
19. U.S. Pat. No. 6,317,081, Nov. 13, 2001, Internal Calibration Method For Receiver System Of A Wireless Location System;
20. U.S. Pat. No. 6,285,321, Sep. 4, 2001, Station Based Processing Method For A Wireless Location System;
21. U.S. Pat. No. 6,334,059, Dec. 25, 2001, Modified Transmission Method For Improving Accuracy For E-911 Calls;
22. U.S. Pat. No. 6,317,604, Nov. 13, 2001, Centralized Database System For A Wireless Location System;
23. U.S. Pat. No. 6,288,676, Sep. 11, 2001, Apparatus And Method For Single Station Communications Localization;
24. U.S. Pat. No. 6,288,675, Sep. 11, 2001, Single Station Communications Localization System;
25. U.S. Pat. No. 6,281,834, Aug. 28, 2001, Calibration For Wireless Location System;

26. U.S. Pat. No. 6,266,013, Jul. 24, 2001, Architecture For A Signal Collection System Of A Wireless Location System;
27. U.S. Pat. No. 6,184,829, Feb. 6, 2001, Calibration For Wireless Location System;
28. U.S. Pat. No. 6,172,644, Jan. 9, 2001, Emergency Location Method For A Wireless Location System;
29. U.S. Pat. No. 6,115,599, Sep. 5, 2000, Directed Retry Method For Use In A Wireless Location System;
30. U.S. Pat. No. 6,097,336, Aug. 1, 2000, Method For Improving The Accuracy Of A Wireless Location System;
31. U.S. Pat. No. 6,091,362, Jul. 18, 2000, Bandwidth Synthesis For Wireless Location System;
32. U.S. Pat. No. 6,047,192, Apr. 4, 2000, Robust, Efficient, Localization System;
33. U.S. Pat. No. 6,108,555, Aug. 22, 2000, Enhanced Time Difference Localization System;
34. U.S. Pat. No. 6,101,178, Aug. 8, 2000, Pseudolite-Augmented GPS For Locating Wireless Telephones;
35. U.S. Pat. No. 6,119,013, Sep. 12, 2000, Enhanced Time-Difference Localization System;
36. U.S. Pat. No. 6,127,975, Oct. 3, 2000, Single Station Communications Localization System;
37. U.S. Pat. No. 5,959,580, Sep. 28, 1999, Communications Localization System;
38. U.S. Pat. No. 5,608,410, Mar. 4, 1997, System For Locating A Source Of Bursty Transmissions;
39. U.S. Pat. No. 5,327,144, Jul. 5, 1994, Cellular Telephone Location System; and
40. U.S. Pat. No. 4,728,959, Mar. 1, 1988, Direction Finding Localization System.

H. Conclusion

The true scope the present invention is not limited to the illustrative embodiments disclosed herein. For example, the foregoing disclosure of a Wireless Location System (WLS) uses explanatory terms, such as wireless device, mobile station, client, network station, and the like, which should not be construed so as to limit the scope of protection of this application, or to otherwise imply that the inventive aspects of the WLS are limited to the particular methods and apparatus disclosed. For example, the terms LDP Device and LES are not intended to imply that the specific exemplary structures depicted in FIGS. 1 and 2 must be used in practicing the present invention. A specific embodiment of the present invention may utilize any type of mobile wireless device as well as any type of server computer that may be programmed to carry out the invention as described herein. Moreover, in many cases the place of implementation (i.e., the functional element) described herein is merely a designer's preference and not a requirement. Accordingly, except as they may be expressly so limited, the scope of protection is not intended to be limited to the specific embodiments described above.

We claim:

1. A system for locating a mobile wireless device configured to communicate with a wireless communications system via a control plane and a user plane, wherein the user plane comprises a data channel, comprising:
a wireless location system (WLS) comprising a plurality of location measuring units (LMUs) configured to be tasked to receive uplink transmissions from the wireless device and to employ algorithms to locate said wireless device using data derived from received uplink transmissions, wherein said WLS is overlaid on said wireless communications system;
a server configured to communicate with said WLS and to communicate via a user plane data channel with a wireless device to be located, and to obtain from said wireless device, via said user plane data channel, information useful for tasking said WLS, wherein said user plane data channel comprises an Internet Protocol (IP) link carried by a user plane of the wireless communications system;
wherein said information useful for tasking includes the following:
a hop pattern being used by the wireless device; and
information useful for at least partially demodulating a signal from the wireless device to extract control signaling and error coding;
wherein said server is further configured to communicate said information useful for tasking to the WLS.

2. A system as recited in claim 1, wherein said information useful for tasking further includes information identifying a reverse channel through which the wireless device is communicating with a serving cell site, and wherein said information identifying a reverse channel comprises a frequency assignment.

3. A system as recited in claim 1, wherein said information useful for tasking further includes information identifying a reverse channel through which the wireless device is communicating with a serving cell site, and wherein said information identifying a reverse channel comprises a channel number assignment.

4. A system as recited in claim 1, wherein said information useful for tasking comprises radio channel information including information indicative of specific receivers which may be used to locate the wireless device, and information indicative of a channel to which receivers should be tuned to locate the wireless device.

5. A system as recited in claim 4, wherein said information indicative of a channel to which receivers should be tuned includes information identifying a radio frequency.

6. A system as recited in claim 4, wherein said information indicative of a channel to which receivers should be tuned includes information identifying a frame.

7. A system as recited in claim 4, wherein said information indicative of a channel to which receivers should be tuned includes information identifying a timeslot.

8. A system as recited in claim 4, wherein said information indicative of a channel to which receivers should be tuned includes information identifying a hop pattern.

9. A system as recited in claim 4, wherein said information indicative of a channel to which receivers should be tuned includes information identifying a modulation scheme.

10. A system as recited in claim 1, wherein said information useful for at least partially demodulating comprises an encryption key.

11. A system as recited in claim 1, wherein said information useful for at least partially demodulating comprises information for error coding and correction.

12. A system as recited in claim 4, wherein said radio channel information comprises information indicative of a serving cell global identifier (CGI).

13. A system as recited in claim 4, wherein said radio channel information comprises information indicative of a serving cell absolute radio frequency channel number (ARFCN).

14. A system as recited in claim 4, wherein said radio channel information comprises information indicative of a serving cell base station identity code (BSIC).

15. A system as recited in claim 4, wherein said radio channel information comprises information indicative of a prior cell global identifier (CGI) and timing advance (TA).

16. A system as recited in claim 4, wherein said radio channel information comprises information indicative of an uplink receive level and quality.

17. A system as recited in claim 4, wherein said radio channel information comprises information indicative of a downlink receive level and quality.

18. A system as recited in claim 4, wherein said radio channel information comprises information indicative of a timing advance (TA).

19. A system as recited in claim 4, wherein said radio channel information comprises a Network Measurement Report (NMR).

20. A system as recited in claim 4, wherein said radio channel information comprises information indicative of an absolute radio frequency channel number (ARFCN).

21. A system as recited in claim 4, wherein said radio channel information comprises information indicative of a timeslot.

22. A system as recited in claim 4, wherein said radio channel information comprises information indicative of a channel type.

23. A system as recited in claim 4, wherein said radio channel information comprises information indicative of a subchannel number.

24. A system as recited in claim 4, wherein said radio channel information comprises information indicative of a frequency list.

25. A system as recited in claim 4, wherein said radio channel information comprises information indicative of a mobile allocation index offset (MAIO).

26. A system as recited in claim 4, wherein said radio channel information comprises information indicative of a hopping sequence number (HSN).

27. A system as recited in claim 4, wherein said radio channel information comprises information indicative of a frame number.

28. A system as recited in claim 4, wherein said radio channel information comprises information indicative of an encryption key.

29. A system as recited in claim 4, wherein said radio channel information comprises information indicative of an encryption algorithm.

30. A system as recited in claim 4, wherein said radio channel information comprises information indicative of an error correction coding method and level.

31. A system as recited in claim 4, wherein said radio channel information comprises information indicative of an assigned frame.

32. A system as recited in claim 4, wherein said radio channel information comprises information indicative of a modulation scheme.

33. A system as recited in claim 4, wherein said radio channel information comprises information indicative of a code division multiple access (CDMA) spreading code.

34. A system as recited in claim 4, wherein said radio channel information comprises information indicative of a pilot pseudo noise (PN) offset.

35. A system as recited in claim 4, wherein said radio channel information comprises information indicative of a reverse pilot channel format.

36. A system as recited in claim 4, wherein said radio channel information comprises information indicative of a beta parameter.

37. A system as recited in claim 4, wherein said radio channel information comprises information indicative of a long code mask.

38. A system as recited in claim 4, wherein said radio channel information comprises information indicative of a spreading factor.

39. A system as recited in claim 1, wherein said server is configured to communicate with said wireless communications system via an Internet protocol-based (IP-based) interface.

40. A system as recited in claim 39, wherein said IP-based interface employs XML (extensible markup language).

41. A system as recited in claim 1, wherein said wireless location system is overlaid on said wireless communications system such that at least one of said LMUs is co-located and shares resources with a base transceiver station (BTS) of said wireless communications system.

42. A system as recited in claim 1, wherein said system includes said wireless device and said wireless device is a location device platform (LDP) device comprising a wireless communications subsystem, a processor and a computer readable storage medium, said LDP device being configured to communicate with said server for providing said information useful for tasking a wireless location system.

43. A system as recited in claim 1, wherein said wireless communications subsystem comprises a radio receiver and a radio transmitter, and wherein said processor and computer readable storage medium are configured such that said LDP device is primarily limited to use as a gaming device.

44. A system as recited in claim 1, wherein said server is a location enabling server (LES) comprising a processor and a computer readable storage medium, said LES being configured to communicate with a gaming server and said wireless location system for the purpose of providing government-regulated gaming services to said wireless device.

45. A system as recited in claim 44, wherein the provision of said gaming services is based on the geographic location of said wireless device.

46. A system as recited in claim 45, wherein said processor and computer readable storage medium are configured such that said LES receives requests from said gaming server and provides information to said gaming server, wherein said information is useful by said gaming server in determining what, if any, gaming services are to be provided to said wireless device.

47. A system as recited in claim 46, wherein said processor and computer readable storage medium are configured such that said LES receives requests from said gaming server and requests location information from said wireless location system.

48. A system as recited in claim 1, wherein said system is configured to operate in connection with a global system for mobile (GSM) wireless communications system.

49. A system as recited in claim 1, wherein said system is configured to operate in connection with a universal mobile telecommunications system (UMTS) wireless communications system.

50. A system as recited in claim 1, wherein said system is configured to operate in connection with a code division multiple access (CDMA) 2000 wireless communications system.

51. A system as recited in claim 1, wherein said system is configured to operate in connection with a WiFi wireless communications system.

52. A system as recited in claim 1, wherein said system is configured to operate in connection with a WiMax wireless communications system.

53. A system as recited in claim 1, wherein the server is configured to transmit control commands to the wireless device to be located for the purpose of disabling discontinuous transmission.

54. A system as recited in claim 1, wherein the server is configured to transmit control commands to the wireless device to be located for the purpose of increasing the transmit power of the wireless device to be located.

55. A method for locating a mobile wireless device configured to communicate with a wireless communications system via a control plane and a user plane, wherein the user plane comprises a data channel, comprising:
    configuring a server to communicate via the user plane data channel with a wireless device, wherein said user plane data channel comprises an Internet Protocol (IP) link carried by the user plane of the wireless communications system;
    obtaining from said wireless device information useful for tasking a wireless location system, wherein said information useful for tasking includes the following:
        information indicative of a serving cell site with which the wireless device is communicating;
        information indicative of at least one cell site neighboring the serving cell site;
        radio channel information including information identifying a reverse channel through which the wireless device is communicating with the serving cell site;
        information indicative of a hop pattern; and
        information useful for at least partially demodulating a signal from the wireless device to extract control signaling and error coding; and
    tasking said wireless location system using the information obtained from said wireless device.

56. A method as recited in claim 55, wherein said information identifying a reverse channel comprises a frequency assignment.

57. A method as recited in claim 55, wherein said information identifying a reverse channel comprises a channel number assignment.

58. A method as recited in claim 55, wherein said radio channel information further comprises information indicative of specific receivers which may be used to locate the wireless device.

59. A method as recited in claim 58, wherein said information indicative of specific receivers includes information identifying a serving cell.

60. A method as recited in claim 58, wherein said information indicative of specific receivers includes information identifying a neighbor cell.

61. A method as recited in claim 55, wherein said radio channel information further comprises information indicative of a channel to which receivers should be tuned to locate the wireless device.

62. A method as recited in claim 61, wherein said information indicative of a channel to which receivers should be tuned includes information identifying a radio frequency.

63. A method as recited in claim 61, wherein said information indicative of a channel to which receivers should be tuned includes information identifying a frame.

64. A method as recited in claim 61, wherein said information indicative of a channel to which receivers should be tuned includes information identifying a timeslot.

65. A method as recited in claim 61, wherein said information indicative of a channel to which receivers should be tuned includes information identifying a hop pattern.

66. A method as recited in claim 61, wherein said information indicative of a channel to which receivers should be tuned includes information identifying a modulation scheme.

67. A method as recited in claim 61, wherein said information useful for at least partially demodulating comprises an encryption key.

68. A method as recited in claim 67, wherein said information comprises information for error coding and correction.

69. A method as recited in claim 61, wherein said radio channel information comprises information indicative of a serving cell global identifier (CGI).

70. A method as recited in claim 55, wherein said radio channel information comprises information indicative of a serving cell absolute radio frequency channel number (ARFCN).

71. A method as recited in claim 55, wherein said radio channel information comprises information indicative of a serving cell base station identity code (BSIC).

72. A method as recited in claim 55, wherein said radio channel information comprises information indicative of a prior cell global identifier (CGI) and timing advance (TA).

73. A method as recited in claim 55, wherein said radio channel information comprises information indicative of an uplink receive level and quality.

74. A method as recited in claim 55, wherein said radio channel information comprises information indicative of a downlink receive level and quality.

75. A method as recited in claim 55, wherein said radio channel information comprises information indicative of a timing advance (TA).

76. A method as recited in claim 55, wherein said radio channel information comprises a Network Measurement Report (NMR).

77. A method as recited in claim 55, wherein said radio channel information comprises information indicative of an absolute radio frequency channel number (ARFCN).

78. A method as recited in claim 55, wherein said radio channel information comprises information indicative of a timeslot.

79. A method as recited in claim 55, wherein said radio channel information comprises information indicative of a channel type.

80. A method as recited in claim 55, wherein said radio channel information comprises information indicative of a subchannel number.

81. A method as recited in claim 55, wherein said radio channel information comprises information indicative of a frequency list.

82. A method as recited in claim 55, wherein said radio channel information comprises information indicative of a mobile allocation index offset (MAIO).

83. A method as recited in claim 55, wherein said radio channel information comprises information indicative of hopping sequence number.

84. A method as recited in claim 55, wherein said radio channel information comprises information indicative of a frame number.

85. A method as recited in claim 55, wherein said radio channel information comprises information indicative of an encryption key.

86. A method as recited in claim 55, wherein said radio channel information comprises information indicative of an encryption algorithm.

87. A method as recited in claim 55, wherein said radio channel information comprises information indicative of an error correction coding method and level.

88. A method as recited in claim 55, wherein said radio channel information comprises information indicative of an assigned frame.

89. A method as recited in claim 55, wherein said radio channel information comprises information indicative of a modulation scheme.

90. A method as recited in claim 55, wherein said radio channel information comprises information indicative of a code division multiple access (CDMA) spreading code.

91. A method as recited in claim 55, wherein said radio channel information comprises information indicative of a pilot pseudo noise (PN) offset.

92. A method as recited in claim 55, wherein said radio channel information comprises information indicative of a reverse pilot channel format.

93. A method as recited in claim 55, wherein said radio channel information comprises information indicative of a beta parameter.

94. A method as recited in claim 55, wherein said radio channel information comprises information indicative of a long code mask.

95. A method as recited in claim 55, wherein said radio channel information comprises information indicative of a spreading factor.

96. A method as recited in claim 55, comprising configuring said server to communicate with said wireless communications system via an Internet protocol-based (IP-based) interface.

97. A method as recited in claim 96, wherein said IP-based interface employs XML (extensible markup language).

98. A method as recited in claim 55, wherein the wireless location system comprises a plurality of location measuring units (LMUs) and further comprising configuring said LMUs to be tasked to receive uplink transmissions from the wireless device and to employ time difference of arrival (TDOA) algorithms to locate said wireless device.

99. A method as recited in claim 98, further comprising overlaying said wireless location system on said wireless communications system such that at least one of said LMUs is co-located and shares resources with a base transceiver station (BTS) of said wireless communications system.

100. A method as recited in claim 55, further comprising providing said wireless device in the form of a location device platform (LDP) device comprising a wireless communications subsystem, a processor and a computer readable storage medium, and configuring said LDP device to communicate with said server for providing said information useful for tasking a wireless location system.

101. A method as recited in claim 100, wherein said wireless communications subsystem comprises a radio receiver and a radio transmitter, and wherein said processor and computer readable storage medium are configured such that said LDP device is primarily limited to use as a gaming device.

102. A method as recited in claim 55, further comprising providing said server in the form of a location enabling server (LES) comprising a processor and a computer readable storage medium, and configuring said LES to communicate with a gaming server and said wireless location system so as to provide government-regulated gaming services to said wireless device.

103. A method as recited in claim 102, wherein the provision of said gaming services is based on the geographic location of said wireless device.

104. A method as recited in claim 103, wherein said processor and computer readable storage medium are configured such that said LES receives requests from said gaming server and provides information to said gaming server, wherein said information is useful by said gaming server in determining what, if any, gaming services are to be provided to said wireless device.

105. A method as recited in claim 104, wherein said processor and computer readable storage medium are configured such that said LES receives requests from said gaming server and requests location information from said wireless location system.

106. A method as recited in claim 55, wherein said method is performed in connection with a global system for mobile (GSM) wireless communications system.

107. A method as recited in claim 55, wherein said method is performed in connection with a universal mobile telecommunications system (UMTS) wireless communications system.

108. A method as recited in claim 55, comprising transmitting control commands, via the user plane data channel, to the wireless device to be located for the purpose of disabling discontinuous transmission.

109. A method as recited in claim 55, comprising transmitting control commands, via the user plane data channel, to the wireless device to be located for the purpose of increasing the transmit power of the wireless device to be located.

110. A non-transitory computer readable medium comprising computer readable instructions for instructing a location enabling server (LES) in performing a method for locating a mobile wireless device configured to communicate with a wireless communications system via a control plane and a user plane, wherein the user plane comprises a data channel, said method comprising:
   configuring said LES to communicate via said user plane data channel with a wireless device, wherein said user plane data channel comprises an Internet Protocol (IP) link carried by a user plane of the wireless communications system;
   obtaining from said wireless device information useful for tasking a wireless location system, wherein said information useful for tasking includes the following:
      information indicative of a serving cell site with which the wireless device is communicating,
      information indicative of at least one cell site neighboring the serving cell site,
      radio channel information including information identifying a reverse channel through which the wireless device is communicating with the serving cell site,
      information indicative of a hop pattern, and
      information useful for at least partially demodulating a signal from the wireless device to extract control signaling and error coding; and
   tasking said wireless location system using the information obtained from said wireless device.

111. A computer readable medium as recited in claim 110, wherein said information identifying a reverse channel comprises a frequency assignment.

112. A computer readable medium as recited in claim 110 wherein said information identifying a reverse channel comprises a channel number assignment.

113. A computer readable medium as recited in claim 110, wherein said radio channel information comprises information indicative of specific receivers which may be used to locate the wireless device.

114. A computer readable medium as recited in claim 113, wherein said information indicative of specific receivers includes information identifying a serving cell.

115. A computer readable medium as recited in claim 113, wherein said information indicative of specific receivers includes information identifying a neighbor cell.

116. A computer readable medium as recited in claim 110, wherein said radio channel information comprises information indicative of a channel to which receivers should be tuned to locate the wireless device.

117. A computer readable medium as recited in claim 116, wherein said information indicative of a channel to which receivers should be tuned includes information identifying a radio frequency.

118. A computer readable medium as recited in claim 116, wherein said information indicative of a channel to which receivers should be tuned includes information identifying a frame.

119. A computer readable medium as recited in claim 116, wherein said information indicative of a channel to which receivers should be tuned includes information identifying a timeslot.

120. A computer readable medium as recited in claim 116, wherein said information indicative of a channel to which receivers should be tuned includes information identifying a hop pattern.

121. A computer readable medium as recited in claim 116, wherein said information indicative of a channel to which receivers should be tuned includes information identifying a modulation scheme.

122. A computer readable medium as recited in claim 110, wherein said radio channel information comprises information useful for at least partially demodulating a signal from the wireless device.

123. A computer readable medium as recited in claim 122, wherein said at least partially demodulating comprises demodulating enough to extract control signaling and error coding.

124. A computer readable medium as recited in claim 123, wherein said information useful for at least partially demodulating a signal comprises an encryption key.

125. A computer readable medium as recited in claim 124, wherein said information useful for at least partially demodulating a signal comprises information for error coding and correction.

126. A computer readable medium as recited in claim 110, wherein said radio channel information comprises information indicative of a serving cell global identifier (CGI).

127. A computer readable medium as recited in claim 110, wherein said radio channel information comprises information indicative of a serving cell absolute radio frequency channel number (ARFCN).

128. A computer readable medium as recited in claim 110, wherein said radio channel information comprises information indicative of a serving cell base station identity code (BSIC).

129. A computer readable medium as recited in claim 110, wherein said radio channel information comprises information indicative of a prior cell global identifier (CGI) and timing advance (TA).

130. A computer readable medium as recited in claim 110, wherein said radio channel information comprises information indicative of an uplink receive level and quality.

131. A computer readable medium as recited in claim 110, wherein said radio channel information comprises information indicative of a downlink receive level and quality.

132. A computer readable medium as recited in claim 110, wherein said radio channel information comprises information indicative of a timing advance (TA).

133. A computer readable medium as recited in claim 110, wherein said radio channel information comprises a Network Measurement Report (NMR).

134. A computer readable medium as recited in claim 110, wherein said radio channel information comprises information indicative of an absolute radio frequency channel number (ARFCN).

135. A computer readable medium as recited in claim 110, wherein said radio channel information comprises information indicative of a timeslot.

136. A computer readable medium as recited in claim 110, wherein said radio channel information comprises information indicative of a channel type.

137. A computer readable medium as recited in claim 110, wherein said radio channel information comprises information indicative of a subchannel number.

138. A computer readable medium as recited in claim 110, wherein said radio channel information comprises information indicative of a frequency list.

139. A computer readable medium as recited in claim 110, wherein said radio channel information comprises information indicative of a mobile allocation index offset (MAIO).

140. A computer readable medium as recited in claim 110, wherein said radio channel information comprises information indicative of hopping sequence number (HSN).

141. A computer readable medium as recited in claim 110, wherein said radio channel information comprises information indicative of a frame number.

142. A computer readable medium as recited in claim 110, wherein said radio channel information comprises information indicative of an encryption key.

143. A computer readable medium as recited in claim 110, wherein said radio channel information comprises information indicative of an encryption algorithm.

144. A computer readable medium as recited in claim 110, wherein said radio channel information comprises information indicative of an error correction coding method and level.

145. A computer readable medium as recited in claim 110, wherein said radio channel information comprises information indicative of an assigned frame.

146. A computer readable medium as recited in claim 110, wherein said radio channel information comprises information indicative of a modulation scheme.

147. A computer readable medium as recited in claim 110, wherein said radio channel information comprises information indicative of a code division multiple access (CDMA) spreading code.

148. A computer readable medium as recited in claim 110, wherein said radio channel information comprises information indicative of a pilot pseudo noise (PN) offset.

149. A computer readable medium as recited in claim 110, wherein said radio channel information comprises information indicative of a reverse pilot channel format.

150. A computer readable medium as recited in claim 110, wherein said radio channel information comprises information indicative of a beta parameter.

151. A computer readable medium as recited in claim 110, wherein said radio channel information comprises information indicative of a long code mask.

152. A computer readable medium as recited in claim 110, wherein said radio channel information comprises information indicative of a spreading factor.

153. A computer readable medium as recited in claim 110, wherein said method comprises the use of an Internet protocol-based (IP-based) interface for communications between the server and the wireless location system.

154. A computer readable medium as recited in claim 153, wherein said IP-based interface employs XML (extensible markup language).

155. A computer readable medium as recited in claim 110, wherein said method comprises transmitting control commands, via the user plane data channel, to the wireless device to be located for the purpose of disabling discontinuous transmission.

156. A computer readable medium as recited in claim 110, wherein said method comprises transmitting control commands, via the user plane data channel, to the wireless device to be located for the purpose of increasing the transmit power of the wireless device to be located.

157. A wireless device adapted for use with a system for locating mobile wireless devices configured to communicate with a wireless communications system via a control plane and a user plane, wherein the user plane comprises a user plane data channel, comprising:
a wireless communications subsystem;
a processor; and
a computer readable storage medium;
wherein said device is configured to communicate via said user plane data channel with a server used by said system to provide to said server information useful for tasking a wireless location system, wherein said user plane data channel comprises an Internet Protocol (IP) link carried by the user plane of the wireless communications system;
wherein said information useful for tasking includes the following:
information indicative of a serving cell site with which the wireless device is communicating;
information indicative of at least one cell site neighboring the serving cell site;
radio information including information identifying a reverse channel through which the wireless device is communicating with the serving cell site;
information indicative of a hop pattern; and
information useful for at least partially demodulating a signal from the wireless device to extract control signaling and error coding.

158. A wireless device as recited in claim 157, wherein said wireless communications subsystem comprises a radio receiver and a radio transmitter, and wherein said processor and computer readable storage medium are configured such that said wireless device is primarily limited to use as a gaming device.

159. A wireless device as recited in claim 157, wherein said information identifying a reverse channel comprises a frequency assignment.

160. A wireless device as recited in claim 157, wherein said information identifying a reverse channel comprises a channel number assignment.

161. A wireless device as recited in claim 157, wherein said information useful for tasking comprises radio channel information.

162. A wireless device as recited in claim 161, wherein said radio channel information comprises information indicative of specific receivers which may be used to locate the wireless device.

163. A wireless device as recited in claim 161, wherein said radio channel information comprises information indicative of a channel to which receivers should be tuned to locate the wireless device.

164. A wireless device as recited in claim 163, wherein said information indicative of a channel to which receivers should be tuned includes information identifying a radio frequency.

165. A wireless device as recited in claim 163, wherein said information indicative of a channel to which receivers should be tuned includes information identifying a frame.

166. A wireless device as recited in claim 163, wherein said information indicative of a channel to which receivers should be tuned includes information identifying a timeslot.

167. A wireless device as recited in claim 163, wherein said information indicative of a channel to which receivers should be tuned includes information identifying a hop pattern.

168. A wireless device as recited in claim 163, wherein said information indicative of a channel to which receivers should be tuned includes information identifying a modulation scheme.

169. A wireless device as recited in claim 161, wherein said radio channel information comprises information useful for at least partially demodulating a signal from the wireless device.

170. A wireless device as recited in claim 169, wherein said at least partially demodulating comprises demodulating enough to extract control signaling and error coding.

171. A wireless device as recited in claim 170, wherein said information useful for at least partially demodulating comprises an encryption key.

172. A wireless device as recited in claim 170, wherein said information useful for at least partially demodulating comprises information for error coding and correction.

173. A wireless device as recited in claim 161, wherein said radio channel information comprises information indicative of a serving cell global identifier (CGI).

174. A wireless device as recited in claim 161, wherein said radio channel information comprises information indicative of a serving cell absolute radio frequency channel number (ARFCN).

175. A wireless device as recited in claim 161, wherein said radio channel information comprises information indicative of a serving cell base station identity code (BSIC).

176. A wireless device as recited in claim 161, wherein said radio channel information comprises information indicative of a prior cell global identifier (CGI) and timing advance (TA).

177. A wireless device as recited in claim 161, wherein said radio channel information comprises information indicative of an uplink receive level and quality.

178. A wireless device as recited in claim 161, wherein said radio channel information comprises information indicative of a downlink receive level and quality.

179. A wireless device as recited in claim 161, wherein said radio channel information comprises information indicative of a timing advance (TA).

180. A wireless device as recited in claim 161, wherein said radio channel information comprises a Network Measurement Report (NMR).

181. A wireless device as recited in claim 161, wherein said radio channel information comprises information indicative of an absolute radio frequency channel number (ARFCN).

182. A wireless device as recited in claim 161, wherein said radio channel information comprises information indicative of a timeslot.

183. A wireless device as recited in claim 161, wherein said radio channel information comprises information indicative of a channel type.

184. A wireless device as recited in claim 161, wherein said radio channel information comprises information indicative of a subchannel number.

185. A wireless device as recited in claim 161, wherein said radio channel information comprises information indicative of a frequency list.

186. A wireless device as recited in claim 161, wherein said radio channel information comprises information indicative of a mobile allocation index offset (MAIO).

187. A wireless device as recited in claim 161, wherein said radio channel information comprises information indicative of a hopping sequence number.

188. A wireless device as recited in claim 161, wherein said radio channel information comprises information indicative of a frame number.

189. A wireless device as recited in claim 161, wherein said radio channel information comprises information indicative of an encryption key.

190. A wireless device as recited in claim 161, wherein said radio channel information comprises information indicative of an encryption algorithm.

191. A wireless device as recited in claim 161, wherein said radio channel information comprises information indicative of an error correction coding method and level.

192. A wireless device as recited in claim 161, wherein said radio channel information comprises information indicative of an assigned frame.

193. A wireless device as recited in claim 161, wherein said radio channel information comprises information indicative of a modulation scheme.

194. A wireless device as recited in claim 161, wherein said radio channel information comprises information indicative of a code division multiple access (CDMA) spreading code.

195. A wireless device as recited in claim 161, wherein said radio channel information comprises information indicative of a pilot pseudo noise (PN) offset.

196. A wireless device as recited in claim 161, wherein said radio channel information comprises information indicative of a reverse pilot channel format.

197. A wireless device as recited in claim 161, wherein said radio channel information comprises information indicative of a beta parameter.

198. A wireless device as recited in claim 161, wherein said radio channel information comprises information indicative of a long code mask.

199. A wireless device as recited in claim 161, wherein said radio channel information comprises information indicative of a spreading factor.

200. A wireless device as recited in claim 157, wherein said wireless device is a location device platform (LDP) device.

201. A wireless device as recited in claim 200, wherein said wireless communications subsystem comprises a radio receiver and a radio transmitter, and wherein said processor and computer readable storage medium are configured such that said LDP device is primarily limited to use as a gaming device.

202. A wireless device as recited in claim 157, wherein said device is configured to operate in connection with a global system for mobile (GSM) wireless communications system.

203. A wireless device as recited in claim 157, wherein said device is configured to operate in connection with a universal mobile telecommunications system (UMTS) wireless communications system.

204. A wireless device as recited in claim 157, wherein said device is configured to operate in connection with a code division multiple access (CDMA) 2000 wireless communications system.

205. A wireless device as recited in claim 157, wherein said device is configured to operate in connection with a WiFi wireless communications system.

206. A wireless device as recited in claim 157, wherein said device is configured to operate in connection with a WiMax wireless communications system.

207. A wireless device as recited in claim 157, wherein the device is configured to receive control commands from the server for the purpose of disabling discontinuous transmission.

208. A wireless device as recited in claim 157, wherein the device is configured to receive control commands from the server for the purpose of increasing the transmit power of the wireless device.

* * * * *